United States Patent [19]

Brown

[11] Patent Number: 4,710,819
[45] Date of Patent: Dec. 1, 1987

[54] SUSPENSION SYSTEM FOR SUPPORTING AND CONVEYING EQUIPMENT, SUCH AS A CAMERA

[76] Inventor: Garrett W. Brown, 515 Adison Ct., Philadelphia, Pa. 19147

[21] Appl. No.: 760,390

[22] Filed: Jul. 30, 1985

Related U.S. Application Data

[63] Continuation of Ser. No. 445,572, Dec. 1, 1982, abandoned.

[51] Int. Cl.⁴ .................. H04N 5/30; B66C 21/00; G03B 39/00; B63C 11/10
[52] U.S. Cl. ........................ 358/229; 358/108; 358/99; 212/83; 212/76; 248/660; 248/60; 248/58; 254/266; 254/264; 352/243; 354/70; 354/65; 405/191; 405/185
[58] Field of Search ............... 358/108, 229, 210, 125, 358/99; 198/678, 620, 681, 685, 686; 248/51, 52, 58, 60, 68.1, 398, 542, 660, 661, 320, 328, 329, 332, 182, 325; 254/264, 266, 293, 274, 276, 278, 288, 292; 212/76, 77, 78, 79, 80, 194, 223, 255, 83, 97, 98, 121; 352/243, 93; 354/65, 70, 74, 64; 376/222, 248; 405/9, 185, 190, 191

[56] References Cited

U.S. PATENT DOCUMENTS

| | | | |
|---|---|---|---|
| 1,482,244 | 1/1924 | Morton | 354/74 |
| 2,190,093 | 2/1940 | Bossart | 352/243 |
| 2,490,628 | 12/1949 | Isserstedt | 354/74 |
| 2,538,910 | 1/1951 | Miller | 346/107 B |
| 2,602,524 | 7/1952 | Shirley | 187/1 R |
| 2,633,054 | 3/1953 | Black | 104/112 |
| 2,899,882 | 8/1959 | Wylie et al. | 354/70 |
| 2,961,877 | 11/1960 | Edwards | 74/5.22 |
| 3,014,984 | 12/1961 | Jacobson | 358/99 |
| 3,324,239 | 6/1967 | Jacobson | 358/99 |
| 3,437,748 | 4/1969 | Latady et al. | 350/173 |
| 3,626,703 | 12/1971 | Richburg | 405/191 |
| 3,638,502 | 2/1972 | Leavitt et al. | 74/5.34 |
| 3,856,639 | 12/1974 | Rohn et al. | 248/320 |
| 3,925,794 | 12/1975 | Alouges | 354/70 |
| 3,935,380 | 1/1976 | Coutta | 358/108 |
| 4,027,329 | 5/1977 | Coutta | 358/108 |
| 4,033,541 | 7/1977 | Malveg | 248/550 |
| 4,051,535 | 9/1977 | Kelly | 358/108 |
| 4,158,489 | 6/1979 | Gottschalk et al. | 352/243 |
| 4,158,490 | 6/1979 | Gottschalk et al. | 352/243 |

FOREIGN PATENT DOCUMENTS

| | | | |
|---|---|---|---|
| 150740 | 4/1937 | Austria | 354/74 |
| 361332 | 10/1922 | Fed. Rep. of Germany | 354/74 |
| 2632658 | 2/1977 | Fed. Rep. of Germany | |
| 2318664 | 2/1977 | France | |
| 2504490 | 10/1982 | France | 354/65 |
| 160427 | 1/1964 | U.S.S.R. | 354/70 |

OTHER PUBLICATIONS

World Oil, "Unmanned Device Makes Subsea Connections in 600-Foot Water"; by R. W. Scott; Feb. 1, 1968; pp. 33-37.

Primary Examiner—James J. Groody
Assistant Examiner—Michael D. Parker
Attorney, Agent, or Firm—Weiser & Stapler

[57] ABSTRACT

A suspension system for supporting and conveying equipment, such as a camera assembly, includes at least three flexible members, spaced-apart mounting drums for extendably and retractably supporting the flexible members and an equipment support member including an inner section to which the equipment is attached and an outer section connected to the flexible members. The inner and outer sections of the equipment support member are rotatable relative to each other about at least two separate axis of rotation. Preferably the mounting drums for the flexible members are operated by a computer-controlled drive to permit an operator to selectively extend and/or retract one or more of the flexible members to achieve the desired movement of the supported equipment.

67 Claims, 22 Drawing Figures

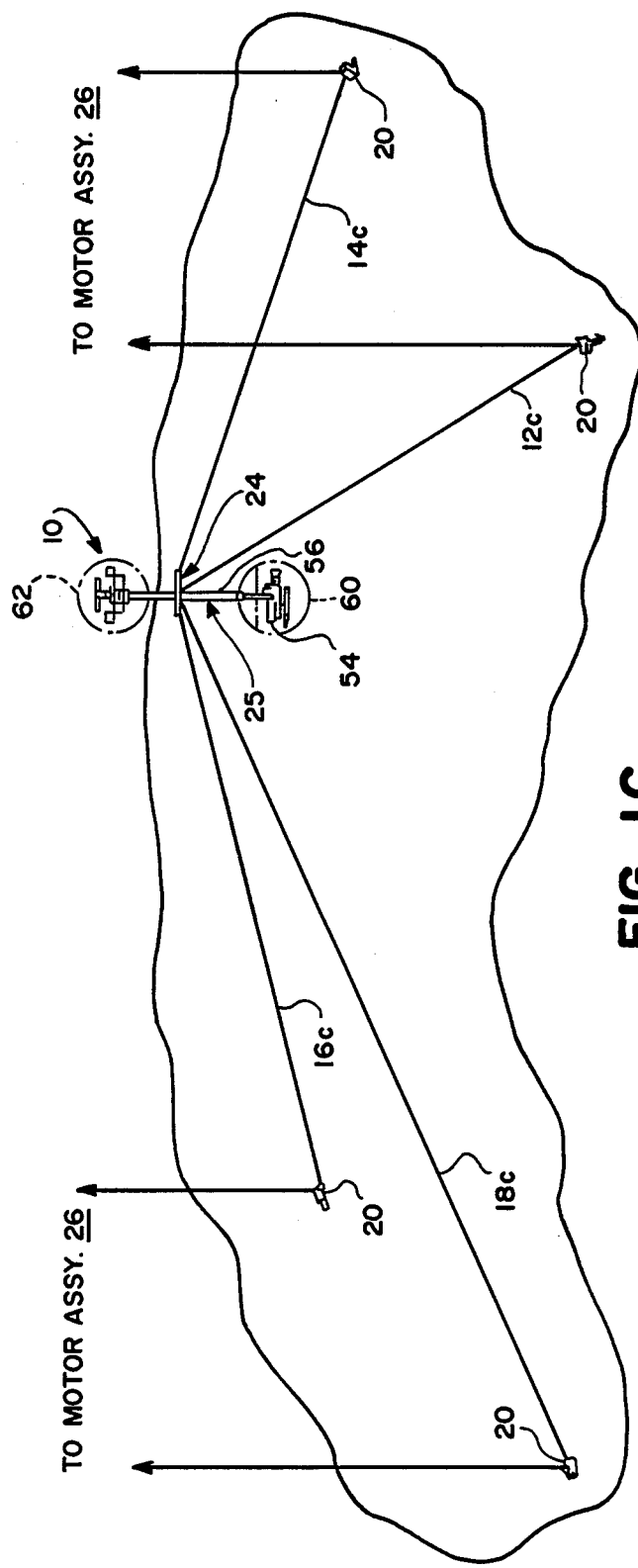
FIG. IC

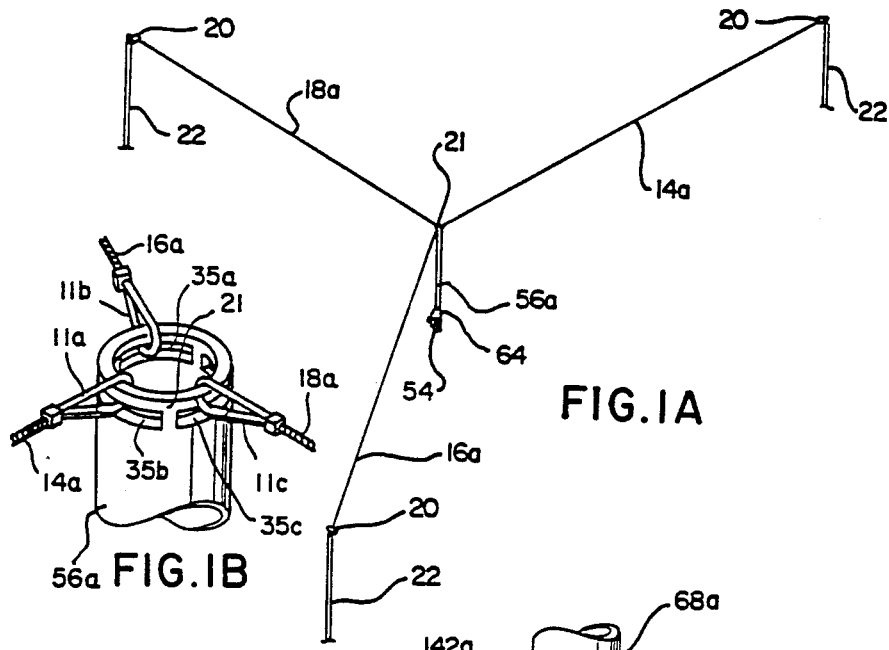
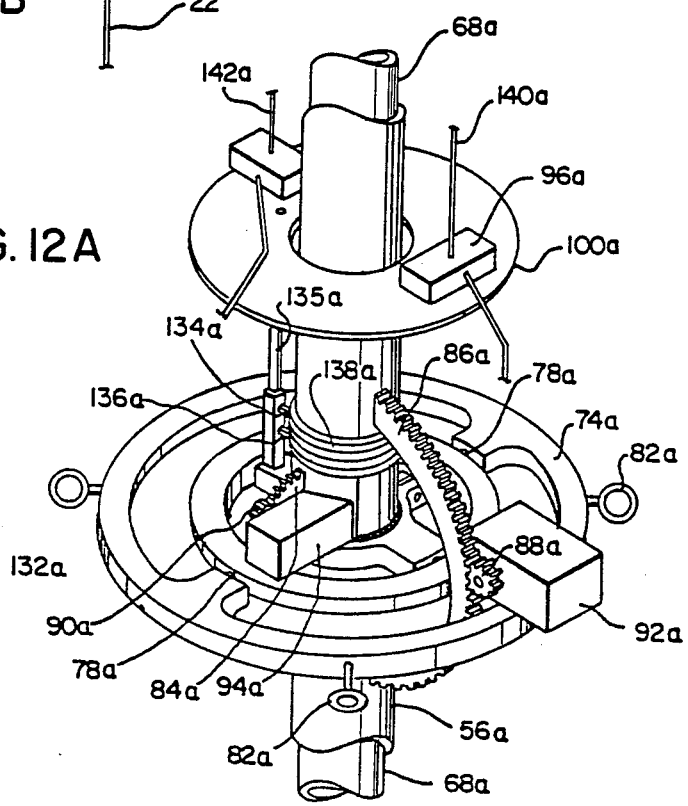

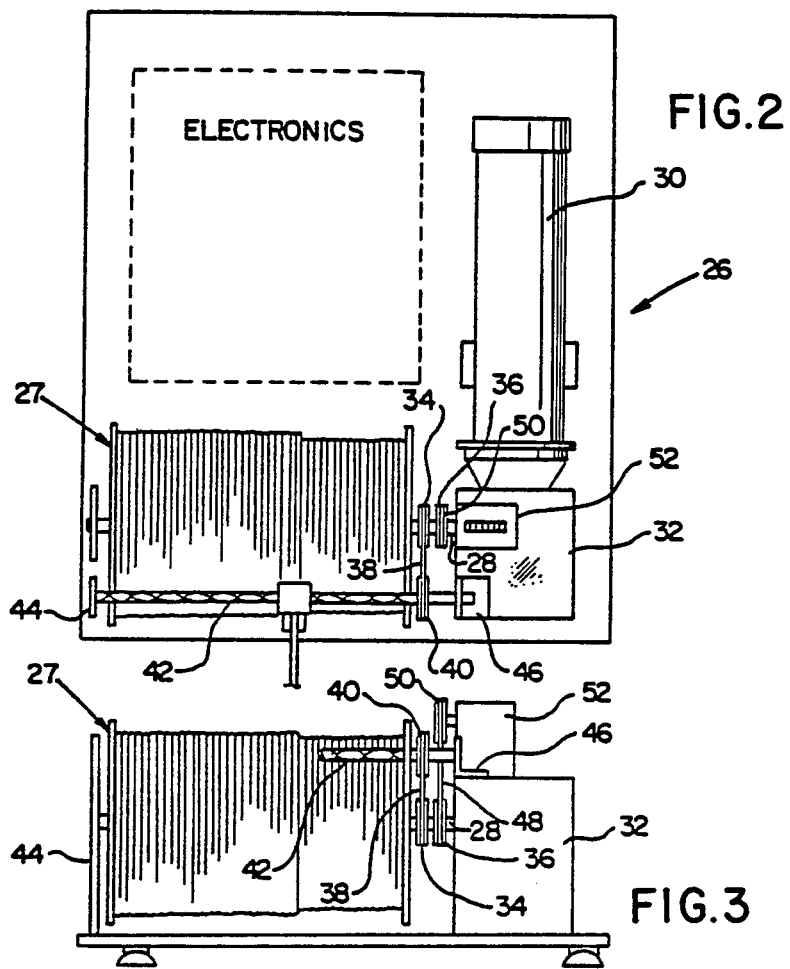
FIG. 2
FIG. 3
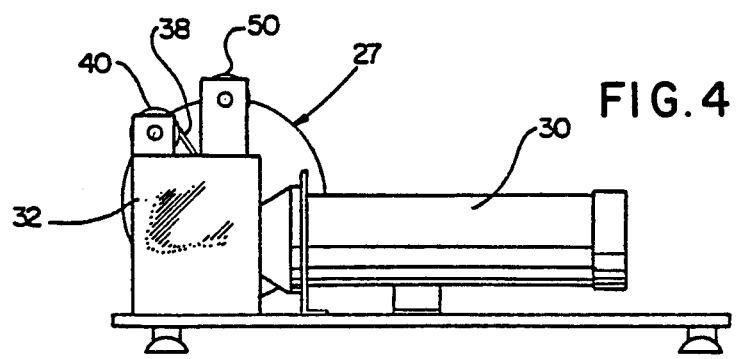
FIG. 4

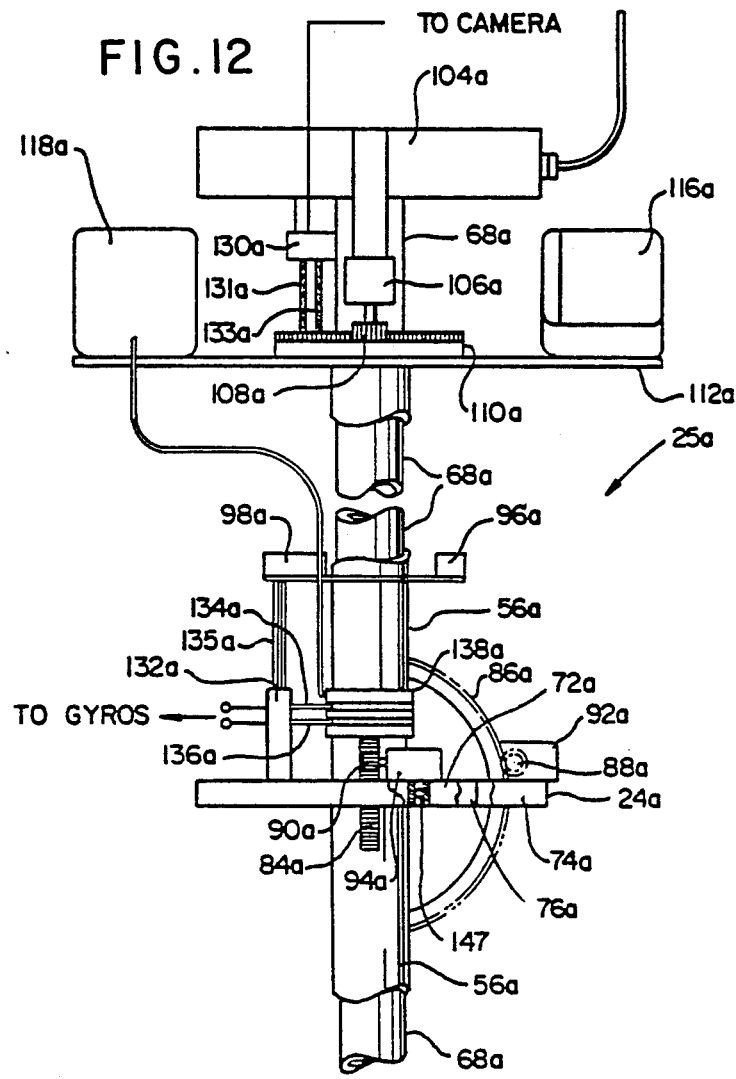

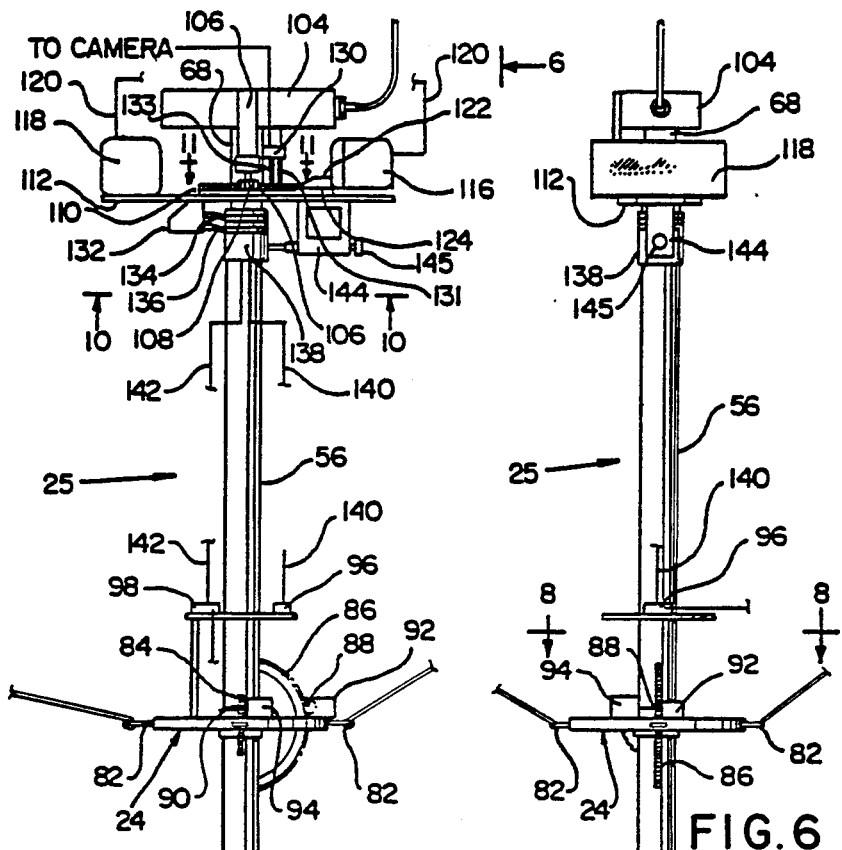
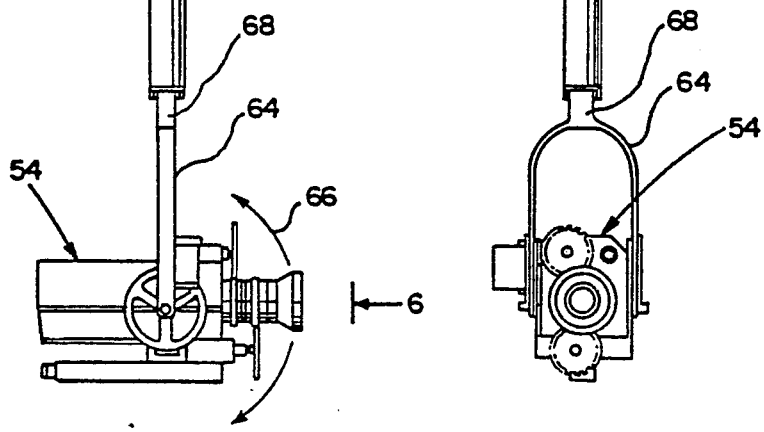
FIG. 5
FIG. 6

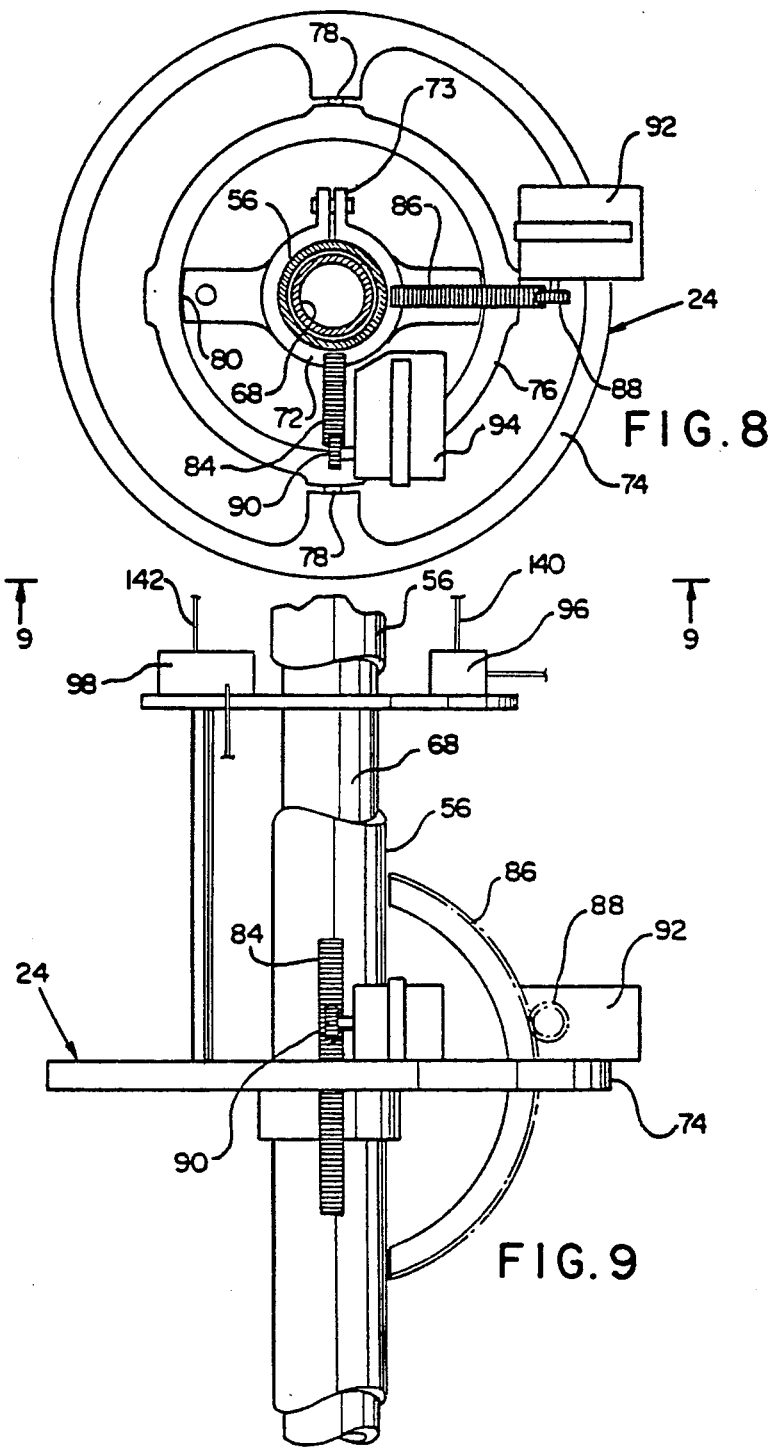

SUSPENSION SYSTEM FOR SUPPORTING AND CONVEYING EQUIPMENT, SUCH AS A CAMERA

This is a continuation, of application Ser. No. 445,572, filed Dec. 1, 1982, now abandoned.

MICROFICHE APPENDIX

A microfiche appendix containing a total of 1 microfiche and 32 frames has been submitted with the application.

FIELD OF THE INVENTION

This invention relates generally to a suspension system, and more specifically to a suspension system for supporting and conveying equipment, such as photographic and video equipment, throughout large volumes of space with the requisite stabilization to achieve high quality images.

BACKGROUND ART

A major concern in the motion picture and video production fields has been to provide for the mobility of the camera, not only laterally or horizontally along the ground, but also vertically in space as well. A number of systems have been devised to achieve this objective, each providing the cameraman with its own particular limited degree of mobility in terms of speed and range. Obviously, an equally important consideration in each case has been to maintain a high quality image which is not excessively degraded by unwanted angular or spatial motions or vibrations of the camera. That is to say, either motions in any of the three perpendicular degrees of angular deviation, or in any of the three directions of motion in space (the x and y axes of lateral motion and the z axis of vertical motion). The hand-held camera, for instance, is highly mobile, but affords an often unacceptable amount of jittering when the operator moves at anything above a slow walk.

In the simplest and earliest forms, camera transporting mechanisms involved wheeled conveyances (dollies) which could be pushed or driven along, and which were often provided with smooth rails, or the like, upon which to travel if the selected path was too bumpy. Dollies then acquired jib arms, and cranes were invented which added a degree of vertical travel. Numerous versions with more or less sophisticated suspensions, in all sizes, had been the state of the art up until the middle 1970's. At that time, the cameraman's arsenal of techniques was expanded by the invention of a stabilizer for the hand-held camera by the present applicant (U.S. Pat. No. 4,017,168) which provides a high-quality image along with an unprecedented degree of freedom for the hand-held camera. The operator can walk, run, climb stairs, ride horseback, etc. and still achieve high quality images. In addition, there have always been various forms of camera mounts on or in conventional vehicles, some of which have been stabilized, which meant that the camera could be transported within the particular limitations of each vehicle. Cameras on cars, trucks and motorcycles, have expanded the range and speed of the moving shot, and cameras on helicopters and airplanes and blimps have provided coverage from high angles above the earth. Unfortunately, each is restricted by design and prudence to its own particular area of safe and effective operation. The motorcycle cannot rise up with the camera, and the helicopter cannot work close to ground level without considerable peril.

This has left an important area of coverage almost entirely without an effective means of camera transport. The problem which has remained unsolved is mainly one of scale, and the area referred to is that in which a great deal of mankind's entertainment takes place. Directors, particularly in video, are constantly faced with the need to deploy cameras in order to shoot events that take place within huge more-or-less enclosed spaces. Everything from the Academy Awards to the Olympics, from the concert stage to the athletic stadium. Hundreds of such spectacles end up on network air time yearly in this country alone. It is relatively easy to arrange any number of ground-based or balcony-mounted camera positions, but as it is frequently difficult to move these cameras, they usually end up as static shots, zooming in and out near the telephoto end of the lens. It is obviously highly desirable to be able to move the camera in an unrestricted manner without worrying about obstacles on the ground, and without inhibiting the enjoyment of spectators on the scene. The camera should be capable of moving rapidly, even at ground level and close to the participants, without danger, and ideally should then be able to fly hundreds of feet up and away to hold completely still for any of the spectacular high-angle shots of which directors dream.

Such shots have been unobtainable heretofore. For example, consider a televised NFL football game. They employ dozens of fixed cameras high up in the stands and at positions on the ground. They also employ a camera dolly or two, which can run up and down the sidelines, and at times even a crane with perhaps a thirty foot arc to shoot down upon the players' bench and the coaches from the sidelines. This leaves approximately 99.9% of the volume of a stadium in which it is currently impossible or impractical to deploy a camera. Recent experiments with an overhead mounted camera in some stadiums have been tantalizing because the angle is spectacular, but once mounted, the camera is stuck in its spot and can only do approximately what the "press-box" cameras do if a closer shot is desired—zoom in. Since zooming is an optical magnification of the image, one loses the sense of immediacy that a closer camera would provide, not to mention the excitement of an actual move in to this close position.

In order to provide for camera mobility, prior workers in the art have mounted camera systems on rails, cables, and the like, as is evidenced by the disclosures in U.S. Pat. Nos. 2,538,910 (Miller), 2,633,054 (Black), 3,437,748 (Latady et al.), 3,935,380 (Coutta) and 4,027,329 (Coutta). Although the above systems do provide a certain degree of mobility they obviously are limited to movement along the predetermined path of travel that is established by the prearranged configuration of the track.

It also has been suggested to provide mounting structures for attaching camera systems to aircraft, such as helicopters, as is evidenced by the disclosure in U.S. Pat. No. 3,638,502 (Leavitt et al). Although cameras mounted in this fashion have a high degree of mobility, they obviously can not be employed close to ground level, such as is often desired in photographing athletic events. Moreover, these systems clearly cannot be utilized to photograph indoor events.

From the above discussion it should be apparent that existing camera support systems lack versatility, thereby inherently imposing restrictions, or limitations, in photographing many events.

SUMMARY OF THE INVENTION

The present invention relates generally to the field of suspension systems, and more particularly, is directed to a cable suspension system for supporting and conveying photographic, video or other equipment to a selected position within a defined space. In the case of photographic and video equipment, stabilization means as required to achieve high quality images are included.

In accordance with a simple embodiment of this invention, the camera equipment is suspended vertically from a tubular member, or spar, that in turn is attached to the respective ends of a plurality of at least three flexible cables. If the mass of the assembly is predominately below the support member, it can be quite bottom-heavy, thereby having a quick pendular rate depending upon its degree of bottom heaviness. In such a bottom heavy system, undesired pendular motion is easily imparted to the camera assembly by merely accelerating or decelerating it close to or in phase with its pendular rate. Although employing a bottom-heavy system is within the purview of this invention, and can be tolerated when the camera assembly is to be moved at slow speeds, or alternatively, when sufficient time is available for the camera assembly to come to rest prior to being used, the more preferred embodiments are not significantly bottom-heavy.

In a simple embodiment, the supported assembly, which may be a camera assembly including remote control equipment, batteries, etc., is statically balanced to be slightly bottom heavy, so that its pendular period of swinging is extremely slow. Therefore, if its rate of movement is changed at a speed which is considerably outside this pendular rate, it can then be moved around and stopped and started without serious angular deviations. Such an arrangement might be suitable for use within enclosed spaces or even outside spaces on days in which there was no wind.

In this simple embodiment, the pan axis remains directly connected to the supporting cables, therefore a fast acceleration of the camera's mass in the pan axis may produce a slight backlash and indeed precession of the entire assembly, since it will be opposed only by the lateral force of the connecting cables. Also, vibrations in the connecting cables may produce a corresponding vibration in the camera pan axis. Although this simple embodiment could be extremely useful within confined spaces, it is apparent that the invention will be greatly more advantageous if a higher degree of isolation from the supporting cables can be obtained, and if the vertical axis is stabilized against the effects of wind and lateral accelerations.

The Preferred Structure

In the preferred embodiment, the present invention combines four computer-controlled cable drums with cables deployed through pulleys mounted upon four of the highest available, widest apart, and roughly equidistant positions, the cables running to and supporting a camera assembly. By selectively extending and retracting the various flexible cables in a predetermined manner, the camera assembly can be made to move in virtually any horizontal path, vertical path, or a combination of the two, limited only by the location of the spaced-apart mounting means for the cables. The camera assembly is connected to the cables by means that preferably provide the equivalent angular isolation of at least a two-axis gimbal, and preferably is divided into at least two statically and dynamically balanced masses, with the gimbal roughly at the center of gravity of said masses.

The camera assembly includes a camera of known construction that is remotely controlled by conventional means, and its video image (either the actual output of a video camera, or the reference video-assist image of a film camera) is sent by wireless means to the remote operators' position. The computer interprets the directional commands of the operator(s) and actuates the motions of the camera in three-dimensional space by calculating the speed and amount of cable required to be taken in or let out by each of the motors in order that the camera move in space according to the operators' intention. Further, the computer will produce this result even though the separate mounting positions are of different heights, and spaced apart at irregular intervals.

Each of the masses of equipment, both above and below the gimbal, must in addition, be statically balanced around the axis perpendicular to the earth, so that upon acceleration in any lateral direction, no rotational impetus is imparted to the camera components. For purposes of clarification, as herein employed, the said axis shall be referred to as the vertical axis. The camera assembly, which is preferably located below the gimbal connections, rotates about this vertical axis by remote control, at the will of the operator, which shall be called herein, the camera pan axis, when referring to the camera's motions. In addition, the camera assembly can be made to rotate about an axis which is perpendicular to the vertical axis and parallel to the earth which also is ninety degrees offset from a line drawn through the center of the camera's taking lens, and which is designated the camera tilt axis.

Of course, it is seldom desirable that the camera assembly deviate from vertical in terms of what is called herein the camera roll axis, that is, an axis parallel to the line drawn through the center of the taking lens. Only the camera pan axis maintains a fixed relationship to the overall vertical axis defined above. Obviously, as the camera pans around, a deviation in this vertical axis would be at one moment a deviation in tilt, and at another moment a deviation in roll, and in between, a combination of the two. It is therefore clear that it is desirable to maintain this vertical axis erect always with respect to the plane of the earth.

The preferred embodiment includes means to maintain the vertically of the camera assembly by controlling the functioning of the gimbal. Undesired angular deviations which would be apparent in the tilt and/or roll axes of the camera can quickly be compensated for by powered gimbal means employed to move the inner and outer sections of the equipment support member relative to each other, most preferably under the influence of a level-sensing device or sensing means.

Therefore, in the event of uneven wind shear forces or pendular forces induced by the lateral accelerations of the device, the verticality of the camera assembly of this preferred embodiment can be preserved by intermittently or continously functioning the powered gimbal means to overpower the angular freedom of the gimbal means as required.

In this embodiment, the sensing means, which may be based upon bending crystal, gyro or fiber optic technology, is of known construction and will not be described herein. The sensing device is employed for automatically sensing, or detecting any angular deviation of the supported equipment from a desired orientation, such as level, and then automatically operating the powered gimbal means to effect the necessary relative rotation between the inner and outer sections of the equipment support member, in order that the camera assembly is returned immediately to the desired orientation. In addition the inputs to the drive system are automatically feathered to prevent the equipment's inertia from causing a pendular action beyond the desired orientation.

The sensing devices preferably provides several outputs which indicate rate and direction of rotation, rate and direction of acceleration and average position of its internal damped pendulum. These outputs can be mixed to provide the proper instructions to the powered gimbal means so that the equipment will be quickly restored to vertical without overshooting and pendular swinging.

In the preferred embodiment, the powered gimbal means comprises sector gears located within the outer two gimbal rings and servo motors which can be driven to oppose the above named wind shear and acceleration forces by exerting torque against the tension forces of the connecting cables. This arrangement provides for a built-in degree of shock absorption, since the arcuate force required to move each gimbal ring is negligible within the first few degrees and builds rapidly as the connection point's position approaches a tangential relationship to the currently prevalent direction of the tensioned cables.

The preferred embodiment of the invention includes means to render approximately equal any wind loading upon the separate masses above and below the point of connection to the cables. This can include housings or enclosures sized so that the mass which is farther from the said point, is housed in a ball whose cross-sectional area is smaller proportionate to this relative separation, thus producing equal leverage upon the vertical spar to that produced by the closer but larger ball. Preferably these enclosures are spherical, and thereby also prevent the imposition of non-uniform wind shear forces which would tend to cause undesired rotational movement in the pan axis.

In order to eliminate another source of such movement, the preferred embodiment includes means to produce the isolating effect of a three-axis gimbal, which means more completely isolates the camera pan axis from angular deviations induced by the motions of the cables.

Therefore, this embodiment further includes means by which the force needed to move the camera portion of the assembly in the camera pan axis is opposed by the counter-rotation of another mass of components remote from the camera within the assembly. This eliminates the backlash in the camera's pan axis produced by opposing the camera's rotational inertia with only the resilient force of the tensioned cables. The entire camera assembly can operate as if within a closed system with respect to the accelerations of its camera components, and no force is required from without the system in order to pan the camera. This arrangement requires a high degree of precision in the placement of the components with respect to their mutual dynamic balance around their common axis of rotation, in order that sudden lateral accelerations do not impart an arbitrary tendency to rotate.

Since the camera, as well as the drive means for rotating the camera about its pan axis are both rotatably movable relative to the equipment support member (i.e. rotatably isolated from said support member) undesired movement, or forces imparted to the equipment support member will not be rotatably transmitted to the camera. The system is designed so that the rotatable member which does not support the camera includes means for opposing the rotational inertia of the camera, thereby permitting the drive means to effectively rotate the camera about its pan axis. In one embodiment of this invention, the means for opposing the rotational inertia of the camera includes inert masses that are statically and dynamically balanced relative to the pan axis, and which are attached to the rotational member that does not support the camera. In an alternative embodiment, air-resistant vanes such as utilized by prior workers in the art, may be positioned on this latter rotatable member so that the air encountered by them provides the necessary resistance to oppose the rotational inertia of the camera.

Trimming, Set-up and Operation

In accordance with the preferred embodiment of this invention, the trimming and set-up operation might proceed as follows:

Each element in the camera assembly which is distinct from any other elements by virtue of the fact that it either rotates relative to said other elements, or is isolated from the position of the outer gimbal ring in at least one axis of motion, must itself be statically balanced around the vertical axis. When all such elements are statically balanced, then the entire camera assembly will be in a condition of dynamic balance throughout. Therefore, when any such element rotates, the vertical axis will not depart from plumb due to the new orientation of any unbalanced component.

In practical operation, each such element must be either manufactured so as to be balanced, or more probably, adjusted prior to use, by moving at least one of its components in the x and y axes (those perpendicular to the vertical axis), until said element is balanced. In practice, it would be helpful to provide for a small "tuning gimbal" with gimballed rod and adjustable weight, so that each element could be placed thereon individually, and so adjusted. If this is done, the assembly of all of the elements will remain in static and dynamic balance.

Now the spherical enclosures can be mounted over the masses at the top and bottom of the camera assembly. The sizes of the spheres have been selected so that their respective cross-sectional areas are directly proportional to the relative weights of the masses at opposite ends of the main spar. When the gimbal is properly positioned at approximately the center of gravity of the camera assembly, an additional small, but virtually weightless foam sphere (not shown) can be slid up and down on the main spar to correct for any error in the selection of diameters, to compensate for the wind resistance of the sections of spar exposed above and below the gimbal, and also to correct for a theoretical slight change in the relative wind resistance of the spheres as the wind speed increases. This sliding ball should be adjusted after the following balancing operation has been completed, and with the assembly hanging from its cables in a steady wind of approximately the speed that will prevail during operation.

Finally, the position of the sliding gimbal assembly should be adjusted so that it is within approximately $\frac{1}{2}''$ above the center of balance of the two large masses— for example, the camera equipment below, and the battery and transmitter assembly above. This operation provides the correct degree of bottom heaviness for the entire camera assembly portion of the invention.

Upon arriving at the location of operation, the pulleys for each of the four cables are pulled up to the high positions chosen, with the appropriate cable already threaded through them, and secured with the camera end of the cable held down at the ground, and with the motor drum unwinding the cable as required. (Obviously, the motor and drum sets are secured at any convenient level below the position for their respective pulleys.) The four cable ends are led out to the chosen start position of the camera and attached to the gimbal ring. Each motor is then run in by hand, until the four cables are taken up to the point that they are taut at the camera assembly sufficient to float it just above the ground.

The computer program is booted up, and upon cue from the computer, the program is inputed with the positions of the four suspension points, relative to the start position of the camera, which is considered "0" in all three axes. The computer is instructed to recognize the boundaries of any area not considered "safe" for the camera assembly to enter. (Such as any area below ground level.) Control of the camera assembly is then turned over to the position operator's joystick and elevator controls. Of course, the actual camera operator is in control of the camera's pan, tilt, zoom, focus, etc. by conventional wireless means.

As the camera assembly is hanging from the gimbal and four supporting cables, the automatic level sensing mechanism is turned on, after a final check that the camera assembly does in fact hang upright, barring the influence of any outside phenomenon, such as wind.

The sensor, preferably a conventional bending crystal inclinometer, detects displacement from vertical, and provides an exact voltage in linear correspondence to the angular deviation of the sensor. This is accomplished by continuously updating the output of a rate sensor with the output of an internal pendulum which provides an average (integrated over time) reading of the sensors attitude. In practice, however, the tension of the cables on the outer section of the gimbal still allows a degree of resilience when this force is used as a base from which to drive the sector gears and restore the massive camera assembly to an upright condition. Merely using the inclinometer output, therfore results in a pendular oscillation of the equipment, as it accelerates toward verticality and of course swings on through.

In order to dampen this oscillating effect, a system must be employed which exerts a decreasing force which is opposed to the restoring force (as called for by the inclinometer) before the equipment reaches vertical—much as you would exert braking force on a child's swing in order to stop it and its rider smoothly. This opposite force is provided by an accelerometer output which resists any acceleration on the way back to vertical, and is adjusted to feed the circuit with the appropriate voltage to oppose this motion. Finally, a rate sensor output alone, is similarly adjusted and mixed in to oppose any high frequency movement which may be imparted to the outer gimbal ring by the connecting cables. In practice, most of these adjustments can be preset, however it may be necessary to fine tune the accelerometer and rate outputs for particular conditions, such as an extremely windy day, or for operation in huge spaces that require exceptionally long runs of cable from the pulleys to the camera equipment.

Intermittent clutching of the motors driving the gimbal sector gears, as discussed in the summary, (not shown) can be considered an additional refinement of the practice as described in connection with the preferred embodiment. These clutches would be functionally connected between the motors and their driven gears, and powered so as to clutch-in or connect said motors and gears only upon instructions from the level-sensing system which indicate that the spar needs to be returned to vertical. In the absence of such signals, or upon arriving at vertical, the clutches would become inoperative, or disconnected, and in this condition the gimbal would be free to rotate in one or both of its operative axes, and would therefore, serve to virtually isolate the camera assembly from the more or less minute vibrations that might come from any of the supporting cables. In general, it is contemplated that the leverage applied against the vertical axis from these vibrations would be so slight compared to the mass and size of the camera assembly, that the clutches as described above would be unnecessary. However, if the very maximum effectiveness is required of the invention, particularly during high winds, or if the use of the longest telephoto lenses is required, then the intermittant powering of the vertical assembly relative to the outer gimbal ring could be advantageous.

The power of the large motors required to extend and retract the cable connections to the camera assembly, can be roughtly calculated, and depends of course upon a number of variables, including the weight of the camera assembly, the speed of motion required, the height desired for the camera relative to the positions of the support points, and the length and weight of cable deployed. Although a rough idea of the power required can be useful, there is no practical point in attempting to make the above calculations exact, since the number of variables renders the exercise tedious beyond all usefulness. For example, in any four-cable arrangement, a slight change in the length of one of the cables, can cause it to be slack or can slacken yet another cable, resulting effectively in a three-point suspension, with the slack cable providing no lifting component. Therefore the following rough formula provides for such a worst case situation, and also considers that the camera is placed in the exact center of the working area, and that all cable suspension points are of even height above mean ground level. We also assume that the maximum practical camera altitude is the point at the convergence of lines drawn from the four suspension points toward the camera, each of which is depressed on angular five degrees below the common horizontal plane of all four suspension points. In addition, we will consider that the maximum horizontal camera speed over the ground is twenty miles per hour within a working area of 800 feet by 600 feet by 200 feet high, and that the total weight of all cable deployed is no greater than total weight of the camera assembly.

A rough rule of thumb derived from practical experiment and from calculations based upon the above model, yields the following guideline:

For every two pounds of camera assembly weight, approximately one horsepower for each cable motor will be required.

By employing the present invention, a director can specify a camera position virtually anywhere within the vast spaces involved in today's entertainments. The camera can be held steadily at any height between ground level and the height attained when one or more of the cables is tensioned within roughly five degrees of horizontal. The operator can then move the camera to any other point along any path he chooses, curved or straight, at speeds limited only the strength and speed of the motors chosen to run the cable drums. The camera can, for instance, move along the water in a swimming match, six inches above the surface ahead of the lead swimmer, and pull up a hundred feet and look straight down in time for the finish. It can fly fifteen feet above and twenty feet in front of a group of high hurdlers as they run around a track. It can descend from two hundreed feet and pursue the quarterback up the field on a running play, and then hover poised between the goalposts as the extra-point kick comes right at it. The camera can be held stationary twenty feet from the speaker at a convention, and pull back five hundred feet, just above the heads of the cheering conventioneers. Obviously, the possibilities are endless.

Among other advantages, the invention provides this unprecedented mobility for the camera and yet does not involve huge cranes or vast heavy rigs. It can arrive in a few cases within a small vehicle and be set up and running in a hall which has had the necessary support points installed, within about a half an hour. In a continuing event, like the Olympics, it can be dismantled and remounted in another hall within a like short space of time. Further, it can be used in proximity to humans and objects with complete safety, and with the reliability of today's elevators.

The apparatus of the present invention may also be employed to support other portable pieces of equipment wherein mobility and stability may be desirable, for example, certain types of military weapons, lasers, games, surveillance sensors, lighting equipment and the like.

The present invention could also be employed for the pickup, conveyance and release of materials within a large space. Equipped with a conventional remote-controlled hook, grabbing jaws, or other manipulative member, the device could move widely within an open area, lower itself and select a specific item; grasp it, elevate and move to another location; lower down again and release the item in the new location. Adding a remote-controlled camera to the device would allow the remote operator to visually search out, inspect and grasp an item and then deliver it to the new location with complete control. Applications could include retrieving parts for manufacturing, warehousing, dockage, unloading and trans-shipment, or even construction applications using appropriately heavy duty rigging and motors.

Another application contemplated that is within the scope of this invention would be its use to simultaneously light and photograph (or video record) medical operations and the like, for use as a teaching aide, or to provide a record of an operation (possibly even in three-dimensional video or film technique). the remote-controlled camera of the invention could be outfitted with a high-intensity light source, perhaps surrounding the taking lens, and arranged to point along the same axis as the taking lens, as the camera is panned and tilted. The operator could cause the camera/light to hover over the operation, and if the operator sees the area of the operation through the lens, then he can be sure that the light source is also reaching that area. If the surgeon moves to obscure the view, the camera/light is easily repositioned, in three axes of space, to find another clear look at the area of importance. One advantage of this technique, is that the light source can be a more collimated "hard" light, which will provide greater contrast and clarity for the details of the operation, as compared to the large "soft" sources that must be broad enough not to be blocked by the interposition of the surgeons head or hands.

In addition to the above applications, it is contemplated that this invention could be extremely useful for certain underwater operations, such as retrieval procedures and photography. In the event that a buoyant equipment assembly was employed, the flexible cables could be trained about bottom attached pulleys for extension and retraction in a a manner similar to aboveground practice.

As herein employed, the term "camera" is defined as any motion picture device such as a strip film fed camera, a video camera or other device whose stability is essential even when in motion.

Other objects and advantages of this invention will become apparent by referring to the detailed description which follows, taken in conjunction with the accompanying drawings, wherein like reference characters refer to similar parts throughout the several views.

BRIEF DESCRIPTION OF THE DRAWINGS

FIG. 1A is a schematic isometric view of a simplified embodiment of the suspension system.

FIG. 1B is an enlarged, schematic view of the connections of the embodiment of FIG. 1A.

FIG. 1C is a schematic isometric view of an alternative embodiment of the suspension system, for use in underwater applications.

FIG. 2 is a plan view of a motor assembly employed for controlling the operation of cables in the suspension system;

FIG. 3 is an end elevational view of FIG. 2, with part of the ball reversing mechanism removed;

FIG. 4 is a side elevational view of the motor assembly shown in FIG. 2;

FIG. 5 is an end elevational view of a camera assembly in accordance with this invention, with the spherical enclosures removed to show details of construction;

FIG. 6 is an end elevational view of the camera assembly taken along line 6—6 of FIG. 5;

FIG. 8 is an enlarged sectional view along line 8—8 of FIG. 6;

FIG. 9 is a fragmentary end elevational view along line 9—9 of FIG. 8;

FIG. 12 is a fragmentary end elevational view showing an alternate embodiment of a camera assembly;

FIG. 12A is a fragmentary isometric view of the gimbal area illustrated in FIG. 12.

FIG. 15 illustrating the digital processor, or computer; FIG. 16 illustrating the computer-to-serial interface circuit and FIG. 17 illustrating the motor control circuit.

DESCRIPTION OF THE PREFERRED EMBODIMENTS OF THE INVENTION

The suspension system of this invention can be employed to support and convey various different types of equipment, and is best suited for supporting and conveying equipment in an environment wherein mobility and stability are important factors. For example, certain types of military weapons, lasers, surveillance sensors, lighting equipment, industrial retrieval or assembly equipment, games and the like may be suitably handled by the suspension system of this invention. However, in the preferred embodiment of this invention, the suspension system is employed to support and convey a camera assembly, and it is in connection with is embodiment that the invention will be described.

As the term is utilized herein, reference to "camera assembly" refers to the camera itself, as well as to associated components, if employed. For example, the camera assembly in accordance with one embodiment of this invention can include either a strip film fed camera or a video camera, in conjunction with battery packs, a video transmitter, support structures, and associated drive means for effecting movement of the camera about the tilt, roll and pan axes thereof.

Reference throughout this application to "camera" refers to the image receiving component of the assembly, and preferably is either an electronic video type camera or a strip film camera.

Figure 1:
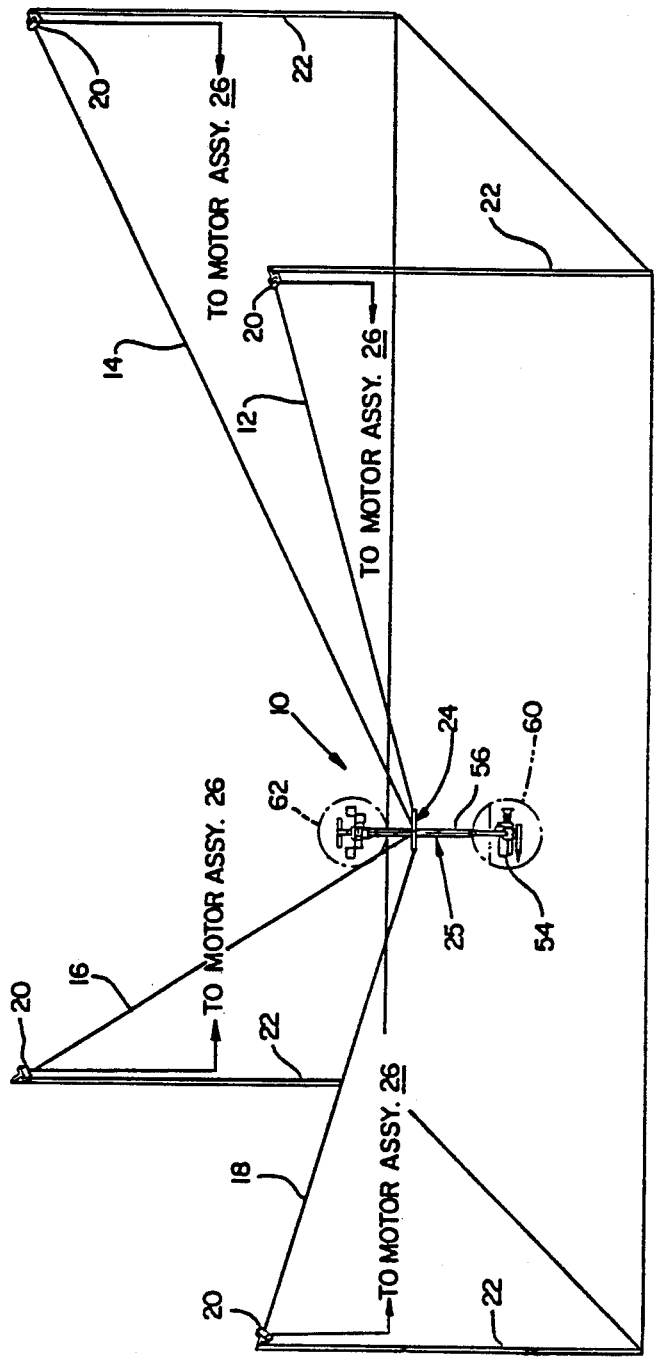
FIG. 1 is a somewhat schematic isometric view of the suspension system for supporting and conveying a camera assembly in accordance with a preferred embodiment of this invetion, and with the spherical enclosures of the assembly being shown in phantom.

Referring to FIG. 1, the suspension system 10 includes four cables 12, 14, 16 and 18, each of which is suspended over a pulley 20 connected to a respective support structure 22. Each of the cables has one of its end attached to an equipment support member 24 which, in the preferred embodiment of this invention, is a multi-axis gimbal. The gimbal 24 is, in turn, attached to the camera assembly 25, details of which will be described later in this application.

Referring to FIGS. 1 and 2, individual motor assemblies 26 are employed to control the movement of each of the cables 12, 14, 16 and 18. Each motor assembly 26 includes a motor-driven reel 27 for supporting one of the cables. Each reel 27 is driven by a shaft 28 connected to a motor 30 through a gearbox 32 (FIG. 2). The driven shaft 28, in addition to driving the rotatably mounted reel 27, also includes two pulleys 34 and 36 fixed to rotate with it. An endless belt 38 is trained about the pulley 34 and a pulley 40 attached to a double-helix, cylindrical shaft 42 of a ball reversing mechanism, the helical shaft being rotatably mounted in bearing supports 44 and 46. Ball reversing mechanisms of the type that can be used in this invention are well known in the art, and need not be described in detail herein. Suffice it to state that the ball reversing mechanism feeds out, or reels in cable in a uniform manner from one axial end to the opposite axial end of its associated reel 27. A second belt 48 is trained about the pulley 36 and a pulley 50 associated with a pulse generator 52. This pulse generator provides a pulse at increments of each revolution of the reel to provide a feedback signal to assist in controlling the desired movement of the camera assembly 25. The motors 30 are computer-controlled, in a manner to be described later in this application, for operating reels 27 to extend and retract the cables in accordance with the instructions from a remote operator.

Turning again to FIG. 1, the camera assembly 25 includes a remotely controlled video, or film-strip camera 54 located at one end thereof and associated components of the camera which are located at the opposite end. The remove-controlled camera 54 can be of any well known design, and does not constitute a part of the present invention. Accordingly, the structure of this camera, as well as the remote control circuitry for tilting, panning and/or zooming the camera, need not be described herein.

An elongate, vertically oriented hollow spar 56 of the camera assembly 25 is attached to the gimbal 24 intermediate its ends. Most desirably, the attachment is made at the center, or the approximate center of gravity of the camera assembly 25 to prevent, or minimize, undesired pendular motion of the assembly as it is being moved.

The opposed ends of the camera assembly are enclosed within spherical members 60 and 62, illustrated in phantom in FIG. 1. The purpose of these enclosures, as well as further details of their construction, will be described in greater detail hereinafter in connection with FIGS. 13 and 14. However, it should be noted that these spherical enclosures can be utilized with all variants of this invention, but will be omitted from most of the figures so as not to obscure other details of construction.

In the simplified embodiment of FIGS. 1A, 1B, a plurality of three flexible cables 14a, 16a, 18a are illustrated. The flexible cables are endwardly affixed to spring clips 11a, 11b, 11c, which clips are attached to substantially the same point, for example a small ring 21 through the openings 35a, 35b, 35c. A support spar 56a affixes to the ring 21 in suitable secure manner to carry the camera assembly. A video or film camera 54 can then be suitably supported from the spar through a yoke 64 for spatial movement as the cables 14a, 16a, 18a are extended and retracted.

Referring to FIG. 1C, the suspension system 10 may also be used in underwater applications by securing the pulleys 20 to the bottom of the body of water, so that the cables 12c, 14c, 16c, 18c progress downwardly from the buoyant suspension system 10, around the pulleys 20, and upwardly to appropriate motor assemblies 26.

Referring to FIGS. 5 and 6, the camera assembly 25 includes a remote-controlled camera 54 rotatably mounted on a yoke 64 in a conventional manner so as to be movable about its tilt axis, in the direction of double-headed arrow 66. A vertically directed tubular member 68, integral with the yoke 64, extends upwardly through the tubular spar 56.

Referring specifically to FIG. 8, the spar 56 is inserted through, and attached to the inner annular hub 72 of the gimbal 24. The annular hub 72 includes a clamping mechanism 73 for frictionally tightening it about the spar to retain the camera assembly 25 in its desired position relative to the gimbal. More particularly, the camera assembly 25 is attached to the annular hub 72 at the center, or approximate center of gravity of said assembly.

Figure 7:
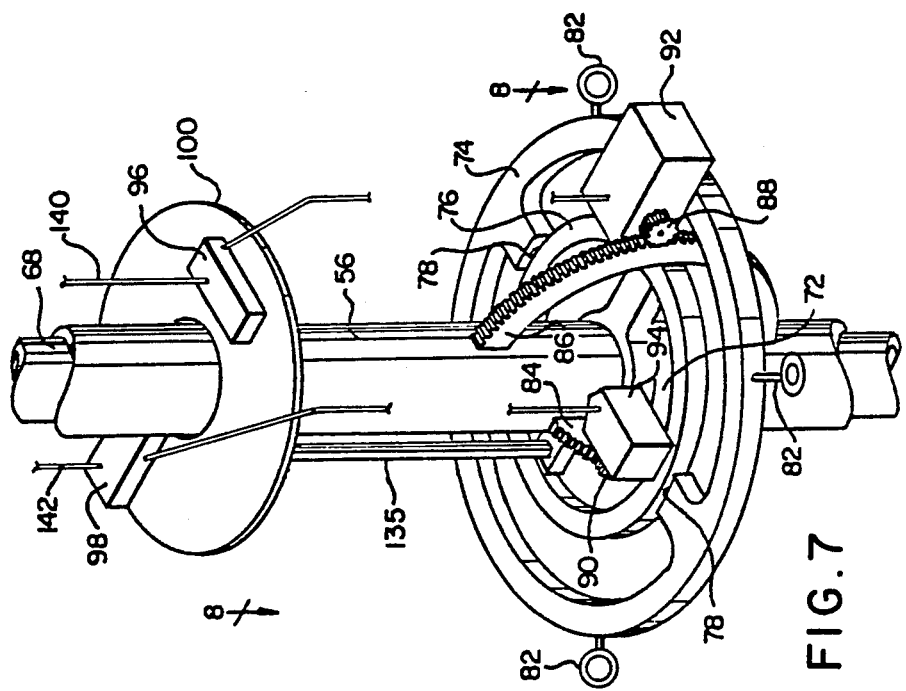
FIG. 7 is a fragmentary isometric view of the camera assembly in the region of the two-axis gimbal illustrated in FIGS. 5 and 6.

Referring to FIGS. 7-9, additional details of the two-axis gimbal 24 will be described. In addition to including the inner hub 72, the gimbal includes an outer annular section 74 and an intermediate annular section 76. A pair of linearly aligned pins 78 define a linear rotational axis between the outer section 74 and the intermediate section 76. Likewise, a pair of linearly aligned pins 80 define a linear rotational axis between the intermediate section 76 and the inner hub section 72 that is oriented at ninety degrees to the rotational axis provided by the pins 78. The effect of this two-axis arrangement is to provide for relative rotational movement between the inner central hub 72, including the camera assembly 25 attached thereto, and the annular outer section 74, to which the individual cables 12, 14, 16 and 18 are attached. This latter attachment can be achieved by any suitable fastening means. For example the cables can be provided with suitable hooks (not shown) for engaging with the eyelets of hooks 82 attached to the outer annular section 74 of the gimbal.

Still referring to FIGS. 7–9, a pair of curved sector gears 84 and 86 are attached to the inner hub 72 and the intermediate section 76 respectively of the gimbal 24. In particular, these sector gears are oriented at ninety degrees to each other, and are in linear alignment with the rotational axes defined by the pins 78 and pins 80, respectively. Motor driven gears 88 and 90 are provided to drive the sector gears for preserving, or establishing verticality of the camera assembly 25. The servo motors 92 and 94 for driving the gears 88 and 90 are secured to the outer annular section 74 and intermediate annular section 76 respectively of the gimbal.

In operation, the movement and/or acceleration of the camera assembly 25 by the suspension system 10 may impart pendular movement to said assembly and thereby cause it to deviate from its desired vertical orientation. In order preserve, or reestablish the desired verticality of the assembly, the servo motors 92 and 94 are actuated to oppose the undesired movement by exerting an opposing torque against the tension force applied to the gimbal 24 by the connecting cables 12, 14, 16 and 18. Although the servo motors 92 and 94 could be remotely controlled by an operator, it is preferred to employ sensing means for automatically actuating the motors in response to a detected, undesired angular deviation of the camera assembly from a desired orientation.

Referring specifically to FIGS. 7 and 9, sensing means, in the form of bending crystal type, pendulum referenced inclinometers 96 and 98, are retained on a supporting shelf 100 that is secured in vertically-spaced relationship to the gimbal 24 by an upstanding rod 102. The inclinometers are employed to detect a deviation of the camera assembly relative to a desired orientation (i.e. relative to an axis perpendicular to the earth), and for actuating the servo motors 92 and 94 in response to the detected deviation to positively rotate the camera assembly back into its desired vertical orientation. It should be noted that actuation of the servo motor 92 will cause relative rotational movement between the annular outer section 74 and the inner annular hub section 72 about the rotation axis provided by the aligned pins 78. In a like manner, actuation of the servo motor 94 will cause relative rotational movement between the intermediate section 76 and annular inner hub section 72 about the rotational axis provided by pins 80. Note that both the annular outer section 74 and the intermediate section 76 will rotate as a single unit relative to the inner hub section 72 about the axis defined by the pins 80.

Referring to FIGS. 5, 6, 10 and 11, the manner in which the various masses associated with the camera assembly are located will be described in detail. Although specific camera-related elements will be described in connection with the preferred embodiment of this invention, it should be understood that the specific elements constituting the transported equipment can be varied widely, depending upon the particular components that one desires to include in the assembly. The most important factor in the preferred embodiment of this invention is that the components be both statically and dynamically balanced so that, during use, uncontrolled, or unpredictable motions of the camera 54 will be avoided.

Referring specifically to FIG. 5, a remote video transmitter 104 is connected to the elongate rod 68 to rotate therewith. A motor 106 is attached to the transmitter and has a drive gear 108 for cooperating with a disc-shaped driven gear 110. This driven gear is attached to a shelf 112, and is adapted to rotate with the shelf about a bearing support 114 which is concentric with the tubular member 68 (FIG. 11).

The horizontal shelf 112 is generally rectangular, and includes two 6-volt batteries 116 and 118 attached at opposite ends thereof. These batteries provide the necessary power to operate the remote video transmitter 104, the remote-controlled camera 54 and the servo motors 92 and 94.

Figure 11:
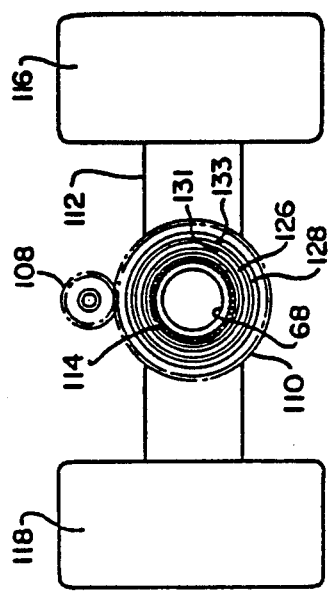
FIG. 11 is an enlarged sectional view along line 11—11 of FIG. 5.

Referring specifically to FIGS. 5 and 11, the batteries 116 and 118 are connected to each other in series by a conductor 120, and in turn, are connected by conductive leads 122 and 24 to conductive annular discs 126, 128 secured to the upper surface of the driven gear 110. A power transmitting member 130 is connected to the elongate rod 68 to rotate therewith, and includes, as part of its structure, spring-loaded conductive pins 131 and 133 for engaging the disc 126 and 128 to transmit power from the batteries to both the transmitter 104 and to the remote controlled camera 54.

Figure 10:
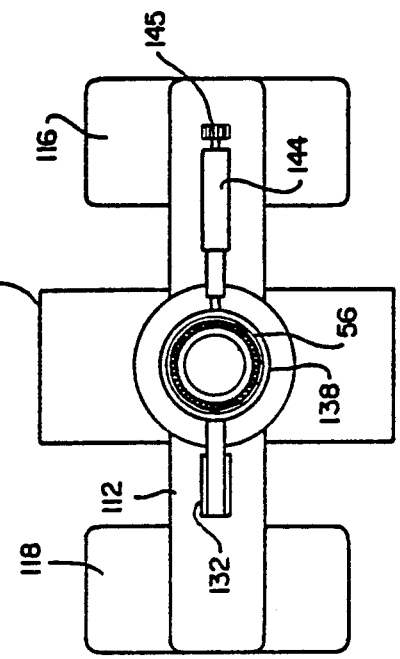
FIG. 10 is an enlarged sectional view along line 10—10 of FIG. 5.

Referring specifically to FIGS. 5 and 10, a second power transmitting member 132 is connected to the bottom of the rectangular shelf 112 to rotate therewith. This member also has conductive leads (not shown) electrically connected to the conductive annular discs 126, 128 associated with the driven gear 110. Conductive brushes 134 and 136 of the power transmitting member 132 cooperate with a slip ring 138 to transmit power through leads 140 and 142 to the gyros 96 and 98 respectively. These gyros are, in turn, connected to the motors 92 and 94 to actuate said motors in response to a detected angular deviation from a desired orientation preferably from an axis perpendicular to the earth.

Still referring to FIGS. 5 and 6, the batteries 116 and 118, in addition to providing the power to operate various components of the camera assembly 25, also constitute spaced-apart, inert masses that have sufficient rotational inertia to oppose the rotational inertia of the camera 54 when the motor 106 is operated to pan the camera about the rotational axis of member 68. When this takes place, the shelf 112, as well as the various components mounted thereon, will be rotated in an opposite direction, relative to the direction of rotation of the member 68. This arrangement of counter rotating masses tends to eliminate backlash when the rotational panning of the camera is stopped suddenly, or when the direction of panning is reversed.

As can be seen best in FIG. 5, a brake 144 is attached to the bottom of shelf 112 to permit adjustment of the rotational drag of the shelf, and its associated structure, about the spar 56. The drag is varied by controlling the amount of force imposed by the brake member 145 on the outer surface of the slip ring 138. The purpose of this brake is to balance the rotational drag between the shelf 112 and the spar 56, on the one hand, with the rotational drag between member 68 and two thrust bearings that are employed to rotatably mount it to the lower and upper ends of the tubular spar 56. Note that in the illustrated embodiment only a single bearing is interposed between the shelf 112 and the elongate tubular member 68, and in this embodiment, the brake 144 is actuated to impart an additional rotational drag equivalent to that provided by the additional bearing between the member 68 and the lower end of the spar 56. If the rotational drag forces were not so balanced, the horizontal shelf 112, and the components attached thereto, would tend to accelerate as panning of the camera continued. Of course, in camera assemblies where the rotational drag is balanced at the outset, a separate brake member will not need to be employed.

The above-described arrangement for rotatably mounting and driving the camera 54 isolates the camera, and in particular the pan axis thereof, from the effects of angular deviations transmitted to the gimbal 24 and vertical spar 56 by motion of the supporting cables 12, 14, 16 and 18. Specifically, this is achieved because the cooperating drive means for rotatably moving the camera 54 about its pan axis is associated with two rotatably mounted members (horizontal shelf 112 and elongate member 68) that are rotatable relative to each other as well as to the supporting gimbal 24. Note that the elongate member 68 rotatably supports the motor 106 and its associated drive gear. The cooperating driven gear 110 is fixably supported on the counter-rotating shelf 112. In view of this arrangement, the camera 54, which is secured to the member 68 through the yoke 64, as well as the remaining battery components, which are attached to the rotatably mounted shelf 112, are rotationally isolated from the vertical tubular spar 56 and its attached gimbal 24.

Referring to FIGS. 12, and 12A, an alternative arrangement for connecting a camera assembly 25a to a supporting gimbal 24a in a manner which virtually isolates the camera from the gimbal will be described. Elements which are identical, or similar to those described in connection with the embodiment of the invention depicted in FIGS. 5 and 6 will be referred to by the same reference numerals, but with a suffix "a" thereafter.

Referring specifically to FIG. 12, a camera assembly 25a can include the same yoke and remote control camera as disclosed earlier. Accordingly, these elements are not illustrated in FIG. 12. The yoke is connected to a tubular member 68a that is rotatably mounted on suitable bearings within the interior of an outer tubular spar 56a. The embodiment illustrated in FIGS. 12 and 12A differs most significantly from the embodiment illustrated in FIGS. 5 and 6 in that the outer tubular spar 56a is rotatably mounted by a bearing support 143 within the annular inner hub 72a of the gimbal 24a. In the embodiment disclosed in FIGS. 5 and 6, the spar 56 is secured to the gimbal 24, and is not rotatable relative to it.

Since the outer tubular spar 56a is rotatable relative to the gimbal 24a, a horizontal shelf 112a, supporting the same components as illustrated in FIG. 5 (if desired), is secured directly to the outer tubular spar 56a to rotate as a unit therewith. Spaced-apart batteries 116a and 118a are connected in series, as described earlier, and in turn, are electrically connected to a slip ring 138a attached to the spar 56a to rotate therewith. Accordingly, the batteries and slip rings will rotate together. Power is transmitted through the slip rings to a power transmitting member 132a through conductive brushes 134a, 136a that cooperate with conductive bands on the slip rings. Power taken by the member 132a is then fed directly to gyroscopes (96a and 98a) for controlling the operation of the motors 92a and 94a in exactly the same manner as described earlier in connection with the embodiment illustrated in FIG. 5. In the embodiment illustrated in FIG. 12, the gyroscopes can be secured to the platform 100a supported by the rod upon which the power transmitting member 132a likewise is attached. The gimbal 24a, except for its rotational mounting to the tubular spar 56a, can be identical to the gimbal 24, including the appropriate sector gears 84a, 86a and cooperating motor driven gears 88a, 90a.

As in the embodiment illustrated in FIG. 52, a remote video transmitter 104a can be secured to the upper end of the upstanding rod 68a, and also can support a motor 106a for driving the gear 108a. Gear 108a cooperates with gear 110a, which in turn, is attached to the shelf 112a to rotate the camera (not shown) about the pan axis provided by the vertical tubular member 68a. The spaced-apart masses 116a and 118a provide sufficient rotational inertia to oppose the rotational inertia of the camera when the motor 106a is operated to pan the camera. In this embodiment the shelf 112a, as well as the tubular spar 56a to which it is attached, will rotate in a direction opposite to the direction in which the camera is being panned. Also, as in the case of the embodiment illustrated in FIG. 5, the rotational pan axis provided by the upstanding tubular member 68a is rotationally isolated from the gimbal 24a. In particular, one of the cooperarting drive gears 108a is associated with the rotatable member 68a, and the other cooperating driven gear 110 is associated with the rotatable outer spar 56. Both the rod 68a and the spar 56a are rotatable relative to each other, and also to the gimbal 24a to thereby establish the desired rotational isolation of the camera.

As described above, both the embodiments of FIG. 5 and FIG. 12 employ inert masses in the form of spaced-apart batteries, to provide the necessary rotational inertia to oppose the rotational inertia of the camera. It is envisioned that in addition to, or in place of the inert masses, upstanding vanes could be provided at opposite ends of the shelf 112 (or 112a) to thereby provide air resistant means, rather than inert masses, to oppose the rotational inertia of the camera. In other words, as the motor 106 (or 106a) is being operated to rotate the camera about its pan axis, the vanes would be driven in an opposite rotational direction with this latter motion being opposed by air resistance against them.

It should be understood that the various components employed in the camera assembly may be varied. However, in the preferred embodiment, the various masses should be distributed along the length of the assembly so that the gimbal can be attached intermediate the ends of the assembly at the center, or the approximate center of gravity thereof. By attaching the camera assembly at its center of gravity to the gimbal, undesired pendular motion of the assembly is minimized as the assembly is being moved by the extension and/or retraction of one or more of the supporting cables. Moreover, to avoid undesired rotational deviations, or excursions about either the tilt, roll or pan axes of the camera, all of the masses should be both statically and dynamically balanced about these axes. Another way to describe this condition is that each mass which is capable of rotation independent of another mass must itself be in static balance around the exact vertical axis. Therefore, as the various components, including the camera, rotate about one another, the entire camera assembly will not then yaw as the unbalanced heavy sides of two masses come into conjunction.

Due to the various different masses employed in the camera assembly, the center of gravity of the assembly may not be in the middle thereof. Therefore, when the camera assembly is attached at its center of gravity to the gimbal, the camera 54, which is supported at one end of the assembly, may be supported at a different distance from the gimbal than components attached at the opposite end of said assembly. When such a system is exposed to wind loading, which can occur even during indoor use at high speed, the torque applied to the assembly above and below the gimbal may be different, the torque being dependent upon both the length of the assembly above and below the gimbal, and the surface areas at opposite ends of the assembly that are exposed to the wind loading. If the lengths of the assembly above and below the gimbal are different, it is entirely possible that the wind will impart an uneven torque to the assembly, thereby causing undesired angular movement of the camera about the tilt and/or roll axis.

Figure 14:
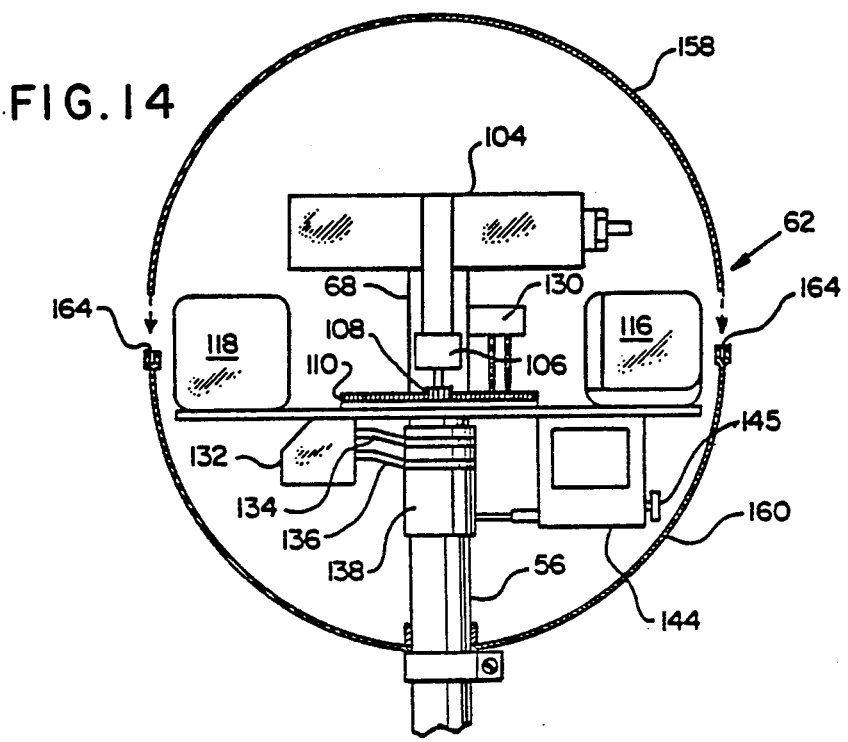
FIGS. 13 and 14 are fragmentary elevational views of opposed ends of the camera assembly, showing the manner in which spherical enclosures are employed to enclose the ends thereof.
Figure 13:
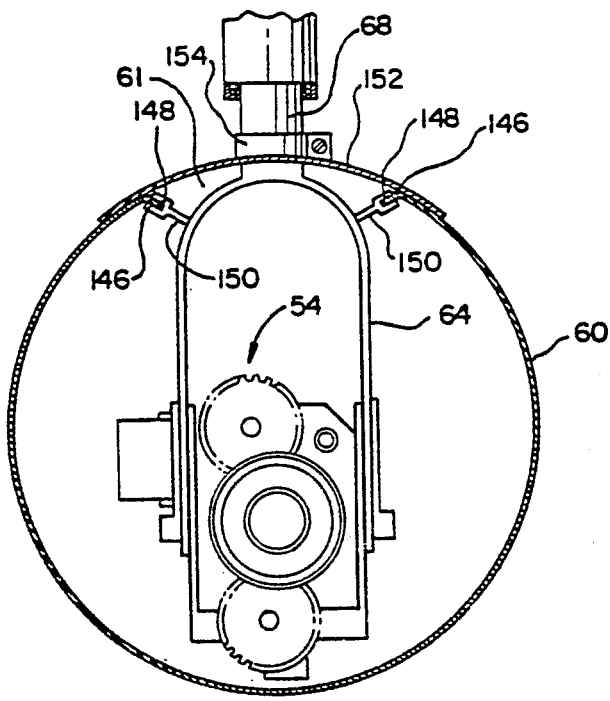

Referring to FIGS. 13 and 14, a preferred arrangement for avoiding uneven wind loading upon the assembly is illustrated. It should be noted that this arrangement can be employed in connection with all embodiments in which the mass is distributed along the camera assembly, on opposite sides of the attaching gimbal. In particular, spherical balls 60 and 62 enclose the masses at opposite ends of the camera assembly. Assuming that the gimbal is correctly positioned at the approximate center of gravity if the camera assembly, the balls 60, 62 are sized so that the end of the assembly that is furthest from the point of connection to the gimbal 24 is housed in the smaller sphere, so that the cross sectional areas of the two spheres are inversely proportional to the relative separations between the gimbal and the opposed centers of the masses at the opposed ends of the assembly, and directly proportional to the relative weights of the said masses. In this manner the wind loading will produce equal leverage upon the vertical spar on opposite sides of its attachment to the gimbal to thereby prevent, or miniminze undesired angular movement of the assembly due to wind loading thereon. Even if some slight angular deviation does take place due to uneven wind shear, it is relatively easy to reestablish proper orientation of the assembly through operation of the motor controlled gears 88 and 90 which are associated with the gimbal 24. In fact, the actual force required to rotatably move the sections of the gimbal to reorient the camera assembly is negligible when only a few degrees of movement are required, but the available force builds up rapidly as the connection points of the cables to the gimbal approach a tangential relationship to the then prevailing direction of the tensioned cables. Therefore, by designing the system so that, at the worst, only slight unwanted deviations in the tilt and roll axes may occur, low-powered motors are operating the control gears 88 and 90 can be employed.

Referring to FIG. 13, the spherical ball 60 is illustrated in its attached position over the yoke 64 of the camera assembly 25. The ball 60 includes a circular opening 61 to permit the ball to be inserted over the yoke. An inturned annular flange 146 about this opening is snapped into grooves 148 associated with spaced-apart globe mounting members 150 that, in turn, are fastened to the yoke 64. A metal, or plastic canopy 152 is secured to an annular clamping member 154 that is slidably mounted along the elongate rod 68, to which the yoke 64 is attached. The clamp member 154 can be secured to the rod 68 with the canopy 152 being closely positioned in overlying relationship with the opening 61 to thereby protect the interior of the globe from rain, dirt and other inclement conditions. The spherical ball 60 also includes an optically clear section (not shown), preferably made of a suitable plastic, such an optical-grade of "Lexan" plastic. This clear section is located along the tilt axis, in alignment with the camera lens so as not to interfere with the photographic process.

Referring to FIG. 14, the spherical ball 62 is employed to enclose the masses (i.e. batteries 116, 118, shelf 112, etc.) at the end of the assembly opposite the camera 54. This ball is formed from two hemispherical sections 158 and 160. The lower section 160 is secured to an annular clamp 161, which in turn, is secured to the outer tubular spar 56. The upper hemispherical section 158 has an annular edge that is frictionally retained in an annular groove, or seat 164 formed about the margin of the lower hemispherical section. In this manner the upper hemispherical section 158 can be removed, in a relatively easy fashion, to permit battery replacements, adjustments, maintenance or other operations that need to be employed in connection with the enclosed masses.

The spherical enclosures 60 and 62 are appropriately sized, taking into account their relative distances from the connecting gimbal 24, to substantially equalize the wind loading upon the opposed ends of the camera assembly 25 so that substantially equal torques are imposed upon the assembly by the wind above and below its area of attachment to the gimbal. In this manner undesired angular deviations of the assembly resulting from wind loading are avoided, or at least greatly minimized.

Also, as indicated earlier in this application, although the preferred embodiment of this invention relates to a camera assembly wherein the masses are distributed along the length thereof, it is within the scope of this invention to employ a camera assembly which is bottom heavy. That is, where the mass is not distributed to establish the center of gravity at, or near the assembly's point of attachment to the gimbal. See FIG. 1A. Although a bottom heavy arrangement is clearly less preferred then the embodiments specifically illustrated herein, such an assembly may be usable in environments where the camera can be employed satisfactorily while being moved at a sufficiently slow speed, that is significantly less than the pendular rate of the assembly. In this manner, unwanted pendulous motion of the assembly may be avoided. However, in many environments, the effects of wind, or air, on the assembly may cause undesired pendulous movement, and thus mitigate against the use of a bottom heavy construction. In these latter situations, the assembly should have its mass distributed in a manner to permit its attachment to the gimbal 24 at its center, or approximate center, of gravity.

It also should be noted that, for some applications, it may not be necessary to completely isolate the pan axis of the camera from the gimbal 24, as is achieved by the constructions illustrated in FIGS. 5 and 12. For example, it is possible that the assembly of FIG. 5 could be employed with the horizontal shelf 112, and components thereon, secured directly to the outer tubular spar 56, so that the shelf and its components would not be rotatable. In such an arrangement, jolting forces imposed upon the system by the motions of the various cables would be transmitted to the camera 54. In particular these forces would be transmitted through the gimbal 24, the vertical spar 56 connected thereto, the driven gear 110 fixed to the spar, the drive gear 108 engaging the driven gear 110, the elongate rod 68 operatively connected to the drive gear 108 through attachment of motor 106 to the remote video transmitter 104, and then to the yoke 64 which supports the camera. Clearly this is not a preferred arrangement. However, in environments wherein undesired jolting forces are slight, or virtually non-existent, such an arrangement might be utilizable.

The suspension system of this invention preferably is computer-controlled, with the computer interpreting the directional commands of the operator, and actuating the motions of the camera in three dimensional space by calculating the cable speed and the amount of cable required to be taken in or let out by each of the motors 28. Moreover, the computer can be made to produce this result even if the separate mounting positions for the respective cables are at different heights and/or are spaced-apart at irregular intervals.

The design of electronic hardware for achieving computer-controlled operation of the suspension system 10 is well within the skill of the art, but will be described generally herein for purposes of completeness. Specifically, the electronic hardware comprises three major components, namely: a digital processor or computer (FIG. 15), a computer-to-serial interface (FIG. 16) and a motor control circuit (FIG. 17).

Figure 15:
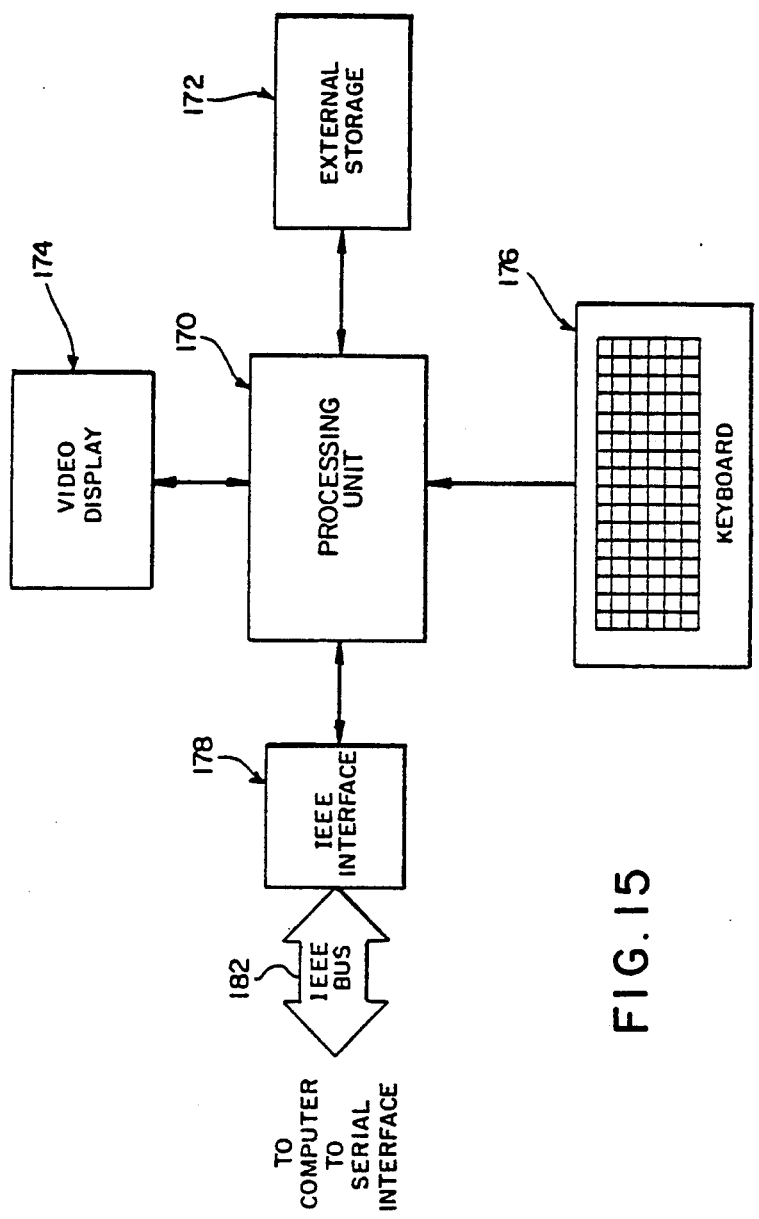

Referring specifically to FIG. 15, a computer utilized in this invention includes a processing unit 170 that runs the control programs and both receives data from, and transmits data to other devices, such as an external storage device 172. This latter component contains a copy of the control programs and data, and also functions to both receive and send the processing unit data. The processing unit 170 also transmits information to a video display unit 174 to display the information in a format that is usable by the operator. A keyboard 176 is employed to actually send data to the processing unit. In the preferred embodiment of this invention, the operator uses the keyboard 176 to define the original position of the suspension point for each of the cables 12, 14, 16 and 18, and also to define any other parameters that will restrict, or pre-define the motion of the suspended camera.

In addition to the initial data setup, the keyboard 176 is employed to actually instruct the processing unit to retrieve the control programs and data from the external storage device 172, and to commence execution of those programs. An interface device, indicated at 178, transfers data (both input and output) between the processing unit 170 and other components of the system. In the preferred embodiment of the invention, the interface 178 consists of an IEEE-488 interface circuit, which conforms to the IEEE-488 standard for parallel data interfacing. Given the proximity of the components herein, a parallel data transfer device is preferred due to its speed of data transmission, although a serial interface, such as the RS-232C or a different parallel interface, could provide the same interface function.

Figure 16:
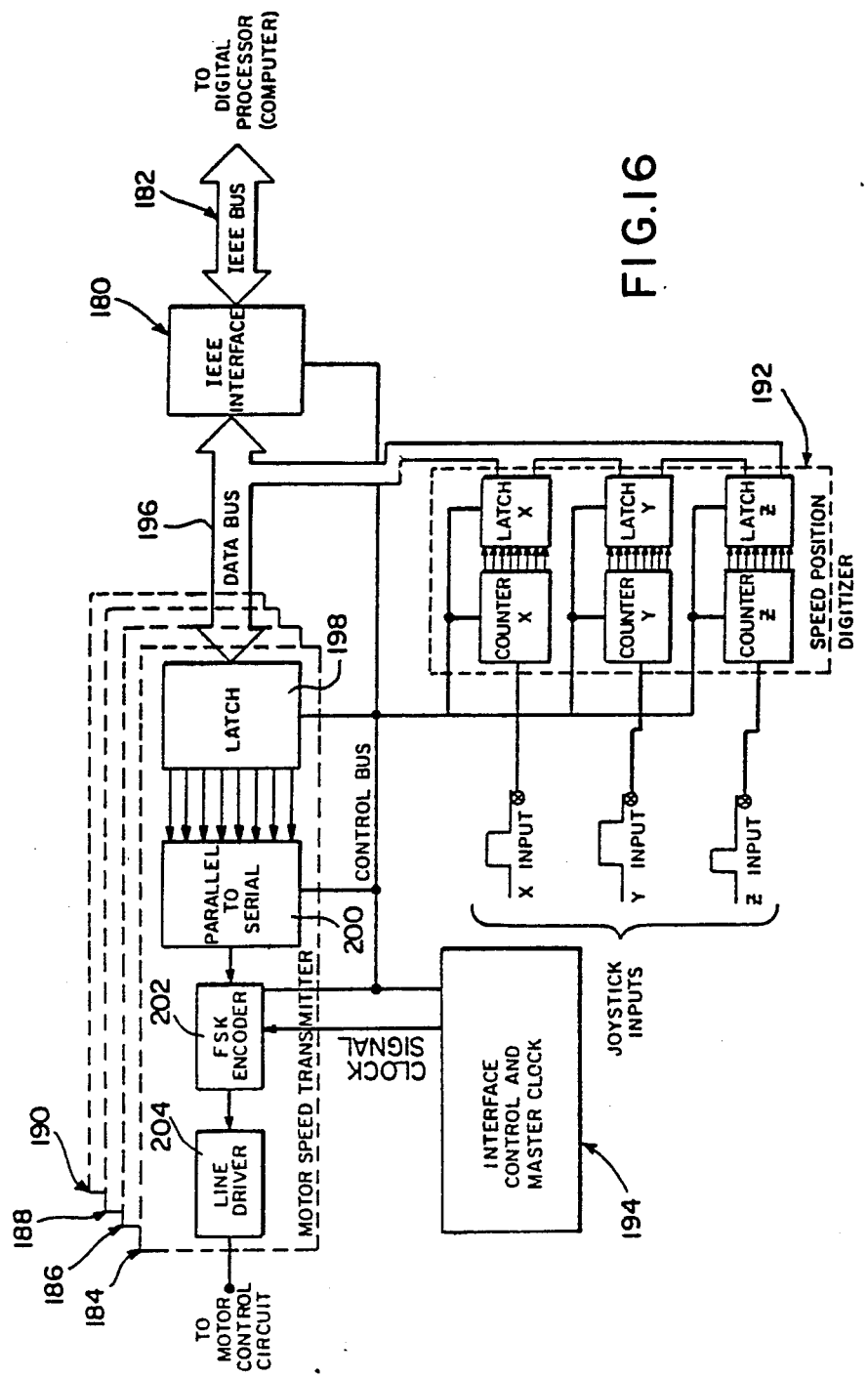
FIGS. 15-17 illustrate, in block form, the electronic hardware employed to control the operation of the suspension system in accordance with this invention.
Figure 17:
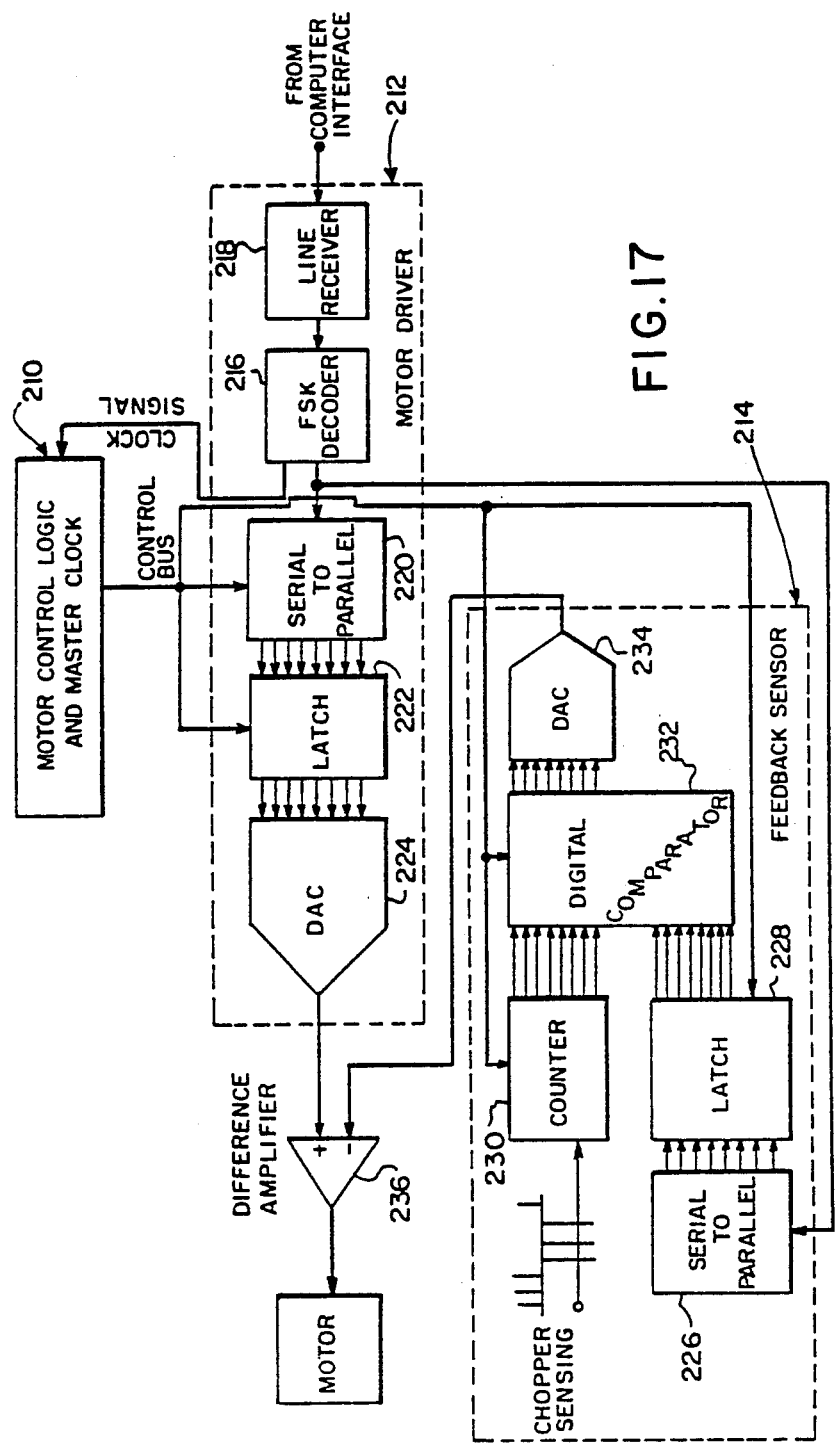

Referring to FIG. 16, the computer-to-serial interface includes four primary circuits. One of these circuits is an IEEE-488 interface circuit 180, similar to the interface 178 referred to in FIG. 15. This interface circuit 180 receives data sent by interface circuit 178 over an IEEE bus 182. As indicated earlier, this interface circuit 180 was selected for its standardization and the speed of parallel data transmission, but could be replaced with a different parallel interface or a serial interface to provide the same function.

The circuit 180 receives two signals for each suspension point/motor. Both signals are proportional to the desired motor speed, and both signals are sent to a motor speed transmitter circuit (i.e. 184, 186, 188 or 190) associated with a respective motor 28.

The IEEE-488 interface circuit 180, in addition to receiving data from interface circuit 178, also sends three signals to the computer over the bus 182, each one including the desired speed of the camera assembly 25 in one of the three coordinate directions (x, y and z). The interface circuit 180 receives these three signals from the speed input digitizer circuit, schematically illustrated at 192. This latter circuit digitizes signals provided by the operator through joysticks or other physical input devices. The computer-to-serial interface further includes an interface control and master clock circuit, schematically illustrated at 194, for exchanging control data with the interface circuit 180 and with other circuits for ensuring synchronization of the various components.

The interface control and master clock circuit 194 serves two major purposes. The first is to provide a master clock to the electronic hardware, so that all components function in a synchronized fashion. The second is to control the flow of activity in the different circuits. Specifically, the interface control and master clock circuit 194 activates and deactivates the electronic elements in the sequence required for proper operation. The interface control and master clock circuit 194 preferably is a hardwired processing unit. However, this circuit may also be implemented as a microprocessor with the control logic stored in ROM, in known manner.

The speed input digitizer circuit 192 receives x, y and z speed-proportional signals and sends those signals to the IEEE interface circuit 180 under the direction of the interface control and master clock circuit 194. The three input signals are directly proportional to the desired speed of the suspension system along its designated coordinates. Each signal activates and deactivates a counter and the output from this counter is read into a digital latch, or register, during a quiescent stage. The latched signal is then sent to the IEEE-488 interface circuit 180. The counters are capable of working simultaneously, but the latched signals are sent sequentially to the interface circuit 180 over the same parallel data bus 196. The sequence of operation of the elements is controlled, as indicated earlier, by the interface control and master clock circuit 194.

Each of the motor transmitter circuits 184, 186, 188 and 190, receives parallel signals from the interface circuit 180, converts these signals to serial signals and transmits them to the motor control circuit to be described hereinafter (FIG. 17), all under the control of the interface control and master clock circuit 194. The parallel data comes in signal pairs, as described above, and the same process is followed by each signal pair, i.e. it is latched from the data bus 196 by the input latch 198. After all data pairs are latched by latch 198, the parallel signals are sequentially passed to the parallel-to-serial converter elements 200 which converts the parallel signals into a serial data stream. This serial transmission can occur concurrently in circuits 184, 186, 188 and 190. The serial data goes through a frequency shift keying (FSK) encoder 202, where it is mixed with a clock signal from the interface control and master clock circuit 194. Therefore, the output from the encoder 202 includes both data and clock signals, mixed and encoded. Although this enbodimant uses FSK encoding, different serial transmission approaches could provide the same function.

This signal then is sent to the motors 28, or more specifically, to the motor control circuit component to be described hereinafter in connection with FIG. 17. This can be done, in a well known manner, through wireless transmission, or over wires. The alternative shown in the diagram illustrates transmission over wires using a line driver element 204. The sequence of operation of all elements in each of the motor speed transmitter circuits is controlled by the interface control and master clock circuit 194. As indicated above, the computer-to-serial interface shown in FIG. 16 has a separate motor speed transmitter circuit for each motor 28 employed to control the movement of a cable. Each of the motor speed transmitter circuits operates under a slight phase shift when reading the parallel data, as necessitated by the transmission of signal pairs over a common data bus 196. The serial transmission to the motor control circuit on FIG. 17 can proceed concurrently.

Referring to FIG. 17, a motor control circuit component of the type employed in connection with each of the motors 28 is depicted. This motor control circuit component consists of three primary circuits, namely a motor control logic and master clock circuit 210, a motor driver circuit 212 and a feedback sensor circuit 214.

The motor control logic and master clock circuit 210 receives a clock signal from the FSK decoder 216 in the motor driver circuit 212. This is the clock signal originated by the interface control and master clock circuit 194 illustrated in FIG. 16, and ensures that the operation of all devices is synchronized. The motor control logic and master clock circuit 210 controls and sequences the operation of all circuits in this component.

The motor driver circuit 212 receives the signals sent by an associated motor speed transmitter circuit 184, 186, 188 or 190 (FIG. 16), this transmission being wireless or over wires, as desired. The specific diagram illustrates a line receiver 218 which receives signals sent over wires. The serial signals go to the FSK bi-phase decoder 216 where they are decoded and decomposed into two data signals and a clock signal. The first data signal continues to flow through this circuit while the second data signal is sent to the feedback sensor circuit 214. The clock signal is sent to the motor control logic and master clock circuit 210. The first data signal goes through a serial-to-parallel converter 220, whose parallel output is stored in a latch or register 222, which in turn provides the input to a digital-to-analog converter 224. The output from this latter converter is a voltage which is proportional to the desired motor speed.

The feedback sensor circuit 214 receives the second data signal from the FSK decoder 216, and this signal also goes through a serial-to-parallel converter 226 and is stored in a latch 228. The feedback sensor circuit 214 also receives a chopper signal proportional to the direction and extent of rotation of the shaft of motor 28, and the chopper signal either increases or decreases a counter 230 (depending on the direction of rotation). The output from this counter and the output from the latched data are input to a digital comparator/arithmatic unit 232, the counter signal being proportional to the desired rotation. The output from the comparator/arithmatic unit 232 drives a digital-to-analog converter 234 to provide a voltage proportional to the difference between the actual and desired motor rotation. The analog signal from the motor driver circuit 212, representing the desired speed, and the analog signal from the feedback sensor circuit 214, proportional to the deviation from the desired speed, are input to a difference amplifier 236, which in turn drives the motor circuitry.

It should be noted that the sequence of operation of all elements in motor driver circuit 212 and feedback sensor circuit 214 is controlled by the motor control logic and master clock circuit 210.

Figure 18:
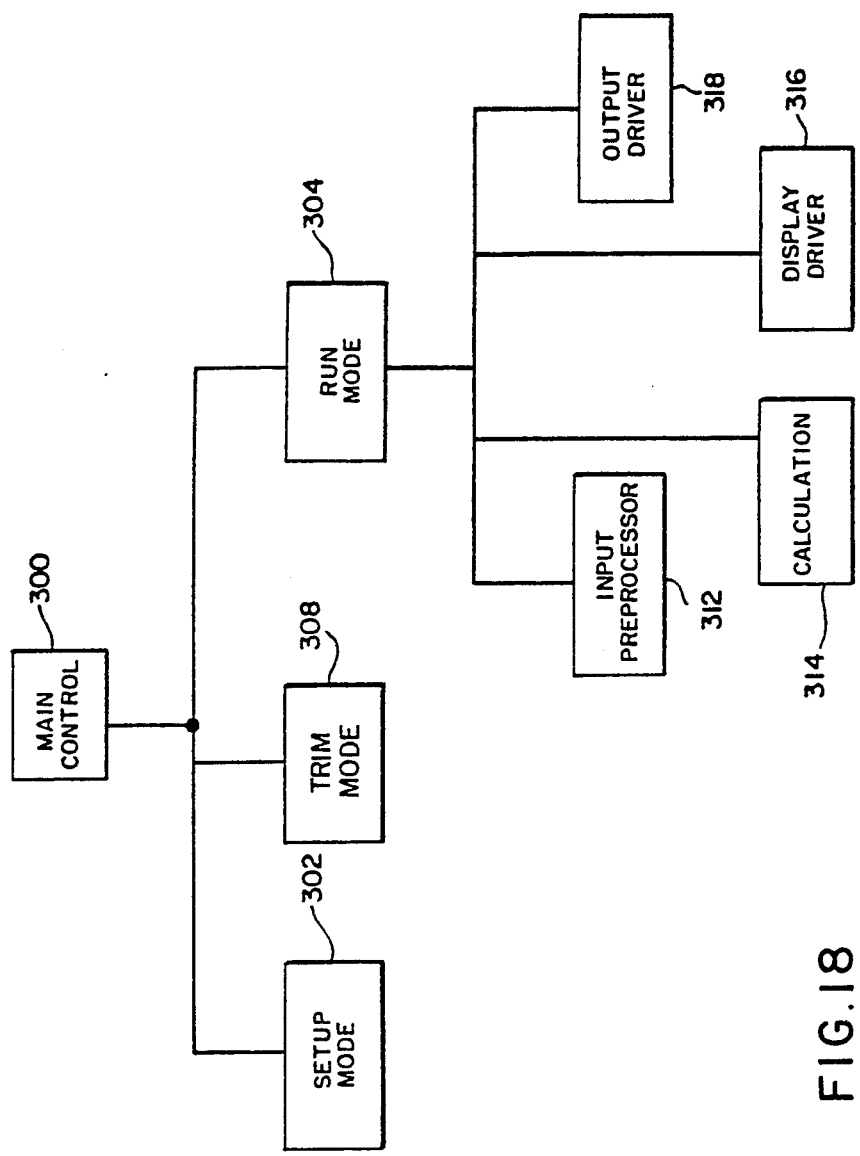
FIG. 18 is a block diagram illustrating the operation of the sofware employed with the electronic hardware in accordance with this invention.

Turning now to FIG. 18, the manner in which the software program is employed in this invention will be described. A main control module 300 functions to display its menu, and then, at the instruction of the operator, transfer control to either a setup mode module indicated at 302, a trim module indicated at 308, or a run mode module, indicated at 304.

The set up module 302 instructs the operator to enter the x, y and z coordinates of each motor. This data is utilized to initialize the position, or line vector for each motor.

The trim module 308 functions to advise the operator to enter identification letters of the desired motor, and then allows manual control of that motor from the keyboard.

The run mode module 304 is the outer processing loop for the run mode. This module responds to an external timing cycle, acquires and preprocesses control input, performs calculations, refreshes the control display and sends control outputs to the motors.

An input preprocessor module 312 starts the processing cycle. Specifically, three control vector values (x, y and z) are read from the communications bus and are converted into coordinate values of a motion vector, the desired motion being checked by the module for boundary violations, and modified if necessary.

A calculation module 314 uses the motion vector to calculate the new values of each of the four line vectors. Also the new length of each line vector is calculated, and substracted from the old length to find the change in length.

A display driver module 316 refreshes the status information displayed on the CRT during the run mode. Specifically, the information displayed includes the x, y and z position of the camera assembly from the origin in meters, the velocity in tenths of a meter per second and a graphic display indicating direction and velocity of motion.

An output driver module 318 takes the change in length for each line vector, converts the length to a value between $-128$ and $+128$, and puts the hexidecimal representation of the value on the communications bus, along with a counter value to facilitate motor speed control.

Included in the microfiche appendix is a computer program listing which has been developed for operation of the electronic hardware set forth in FIGS. 15, 16, 17, when considering the software illustrated in FIG. 18. It is contemplated that the program as designed will be suitable for the purpose and is being set forth to indicate the best made known to applicant at the time the application was filed. However, it will be appreciated that modifications or even complete revisions may prove necessary when actual working models of the invention are developed.

Although the present invention has been described with reference to the preferred embodiment herein set forth, it is understood that the present disclosure has been made only by way of example and the numerous changes in the details of construction may be resorted to without departing from the spirit and scope of the invention. Thus, the scope of the invention should not be limited by the foregoing specification, but rather only by the scope of the claims appended hereto.

What is claimed is:

1. A suspension system for supporting and conveying equipment, said system comprising:
   at least three elongate, flexible members;
   mounting means spaced-apart from each other for extendably and retractably supporting said flexible members;
   an equipment support member attached to each of the flexible members, wherein the equipment support member is adapted to be moved in three directions in response to movement of the flexible members; and
   means for operatively connecting said equipment with said equipment support member so that said equipment is in controllable isolation from angular movement of said equipment support member.

2. The suspension system of claim 1 wherein the support member comprises an inner section to which the equipment is attached and an outer section connected to said flexible members.

3. The suspension system of claim 2 wherein the inner and outer sections are rotatable relative to each other about at least two separate axes of rotation.

4. The suspension system of claim 3 wherein the inner and outer sections of the equipment support member are rotatable relative to each other about axes of rotation which are oriented ninety degrees to each other.

5. The suspension system of claim 1 including power means for individually extending and retracting each of the flexible members.

6. The suspension system of claim 5 including control means for the power means for selectively extending or retracting one or more of said flexible members to move the equipment along a predetermined path.

7. The suspension system of claim 1 wherein said mounting means for extendably and retractably supporting said flexible members are rotatable drums.

8. The suspension system of claim 7 wherein the mounting means further comprises power means adapted to separately rotate each of said drums.

9. The suspension system of claim 8 wherein said power means include computer-controlled motors.

10. The suspension system of claim 1 having four elongate flexible members.

11. The suspension system of claim 3 including drive means for independently rotating the inner and outer sections of the equipment support member relative to each other about at least two of the axes of rotation.

12. The suspension system of claim 11 including a sensing means for detecting angular deviation relative to a desired orientation of equipment attached to the equipment support member.

13. The suspension system claim 12 wherein the sensing means is adapted to actuate the drive means in response to the detected deviation to positively rotate the inner and outer sections of the support member relative to each other to move the equipment into its desired orientation.

14. The suspension system of claim 13 wherein the sensing means comprises a dectacting means for detecting a deviation of the equipment from an axis perpendicular to the earth and for actuating the drive means in response to the detected deviation for positively rotating the inner and outer sections of the equipment support member relative to each other to move the equipment back to its orientation perpendicular to the earth.

15. The suspension system of claim 14 wherein the detecting means is a gyro-like device.

16. The suspension system of claim 14 wherein the detecting means provides a plurality of electrical outputs.

17. The suspension system of claim 16 wherein a first output is responsive to rate and direction of rotation of the equipment and a second output is responsive to rate and direction of acceleration of the equipment.

18. The suspension system of claim 16 and means to mix the plurality of outputs.

19. The suspension system of claim 1 wherein the equipment includes a camera assembly.

20. The suspension system of claim 19 wherein the camera assembly extends through the equipment support member so as to have sections thereof on opposed sides of the support member.

21. The suspension system of claim 19 wherein the camera assembly includes a rotatably mounted camera support, a camera-attaching section located adjacent one end of the camera assembly and a camera attached to the camera-attaching section.

22. The suspension system of claim 21 wherein the camera support is rotatable relative to said equipment support member.

23. The suspension system of claim 22 comprising drive means for rotating the camera support to pan the camera attached thereto.

24. The suspension system of claim 23 wherein the camera assembly is attached at its center, or approximate center of gravity, to the equipment support member to minimize undesired pendular motion of said camera assembly when it is being moved.

25. The suspension system of claim 21 comprising a first enclosure around the camera adjacent one end of the assembly and a second enclosure around other camera assembly elements adjacent the opposite end of the assembly.

26. The suspension system of claim 25 wherein the dimensions of the enclosures are chosen so as to substantially equalize the wind loading upon the opposed ends of the assembly to thereby produce substantially equal leverage on the assembly above and below its area of attachment to the equipment support member.

27. The suspension system of claim 25 wherein the first and second enclosures are spherical.

28. The suspension system of claim 21 wherein the camera assembly comprises two members rotatably mounted relative to each other and to the equipment support member.

29. The suspension system of claim 28 wherein one of the said members is the rotatably mounted camera support to which the camera is attached.

30. The suspension system of claim 29 and drive means interconnecting the two members to rotate them relative to each other in opposite directions.

31. The suspension system of claim 30 and means associated with the rotatable members for opposing rotational inertia of the camera, whereby the two members also are freely rotatable relative to the equipment support member.

32. The suspension system of claim 31 wherein the means for opposing rotational inertia of the camera comprises inert masses.

33. The suspension system of claim 31 wherein the means for opposing rotational inertia comprises an air resistant member.

34. The suspension system of claim 31 wherein the rotatably mounted camera support to which the camera is attached includes an elongate member rotatably mounted within a hollow, elongate tubular spar.

35. The suspension system of claim 34 wherein the hollow spar is non-rotatably attached to the equipment support member.

36. The suspension system of claim 35 wherein the drive means for interconnecting the two members that are rotatably mounted relative to each other and to the equipment support member comprises a first gear attached to the camera support member to rotate therewith.

37. The suspension system of claim 36 wherein the drive means further comprises a second gear cooperating with the first gear, the second gear being rotatably mounted relative to the camera support member about a common rotational axis with the camera support member.

38. The suspension system of claim 34 wherein the rotatably mounted camera support to which the camera is attached comprises a yoke rotatably mounted to an elongate tubular spar adjacent one end thereof, said elongate tubular spar being rotatably mounted to the equipment support member.

39. The suspension system of claim 38 wherein the yoke and the tubular spar constitute the two members which are rotatably mounted relative to each other and to the equipment support member.

40. The suspension system of claim 39 wherein the drive means for interconnecting the two members comprises cooperating gears, one of said gears being associated with the yoke to rotate therewith and the other of the gears being associated with the elongate spar to rotate therewith.

41. A suspension system for supporting and conveying a camera assembly above a given plane, the system comprising:
  at least three cables, each of which has two ends, one end of each cable being connected to a common member;
  spaced-apart, rotatable drums adapted to engage respectively the second ends of the cables for extendably and retractably mounting the cables; and
  an equipment support suspended from the common member to carry the camera assembly;
  wherein said equipment support is operatively associated with said common member so that said camera assembly is in controllable angular isolation from said common member.

42. The suspension system of claim 41 wherein the common member comprises a ring.

43. The suspension system of claim 42 wherein the ring is a gimbal.

44. The suspension system of claim 43 wherein the gimbal comprises an inner section to which the equipment support is attached and an outer section connected to said cables.

45. The suspension system of claim 44 wherein the inner and outer sections are rotatable relative to each other about at least two separate axes of rotation.

46. The suspension system of claim 41 and elevated means to mount at least one of the drums above the said plane.

47. The suspension system of claim 41 and means to rotate the drums in unison to adjust the lengths of the cables as necessary to convey the camera assembly to a preselected location above the said planes.

48. The suspension system of claim 47 wherein the means comprise programmable means.

49. The suspension system of claim 47 wherein the said means comprises a computer.

50. The suspension system of claim 49 wherein the computer comprises a processing unit, an external storage device, a keyboard and a video display.

51. The suspension system of claim 41 and means to selectively extend and retract the cables in predetermined manner whereby the camera assembly can be made to move in virtually any horizontal path, vertical path or a combination of the two.

52. The suspension system of claim 51 wherein the means comprises a programmable computer.

53. The suspension system of claim 41 wherein the plane comprises the bottom of a water containing area and wherein the system comprises pulleys positioned intermediate the common member and the drums, whereby the cables respectively move about the said pulleys in response to rotation of the drums.

54. The suspension system of claims 53 wherein the pulleys are affixed to the said bottom.

55. The suspension system of claim 7 wherein the mounting means further comprises pulleys fixedly connected for engagement by the flexible cables as the cables are extended and retracted, the pulleys being respectively positioned between the equipment support member and said rotatable drums.

56. The suspension system of claim 55 wherein the pulleys are always positioned below the said equipment.

57. The suspension system of claim 56 wherein the pulleys are positioned in a body of water and wherein the equipment is conveyed through the water.

58. In a suspension system for supporting equipment in three-dimensionally adjustable positions by means of at least three cables which are operatively connected to said equipment and which extend away from said equipment in different directions, the combination of:
  at least three elevated support means, one for each of said cables, spaced from said equipment and defining the corners of a three-dimensional space above the surface over which they are elevated;
  means for adjusting the lengths of the cables between the respective support means and the equipment in such relationships as to move said equipment in three directions to place the equipment in any desired position within said three-dimensional space; and means for providing controllable angular isolation of said equipment from the cables which support said equipment.

59. The suspension system of claim 58 wherein the adjusting means comprises means for reeling said cables in or out with respect to said elevated support means.

60. The suspension system of claim 59 wherein the adjusting means further comprises means for coordinating said cable reeling so that one or more cables are reeled in while the remaining cable or cables are reeled out by amounts sufficient to displace said equipment from a given position to another desired position within said three-dimensional space.

61. The suspension system of claim 60 wherein the adjusting means includes computer-controlled motors.

62. The suspension system of claim 1 wherein said equipment is operatively associated with said equipment support member for stabilized stationary support and for stabilized movement in said three directions in response to extension and retraction of said flexible members.

63. The suspension system of claim 62 wherein said equipment is a camera assembly, and wherein said camera assembly includes a camera and is adapted to provide stabilized panning, tilting and rolling of said camera.

64. The suspension system of claim 63 wherein said camera assembly is adapted to provide stabilized panning, tilting and rolling of said camera while said camera assembly is held stationary by said equipment support member and while said camera assembly is being moved in said three directions by said equipment support member.

65. The suspension system of claim 41 wherein said equipment support is operatively associated with said common member for stabilized stationary support of said camera assembly and for stabilized movement of said camera assembly in response to extension and retraction of said cables by said rotatable drums.

66. The suspension system of claim 58 wherein said isolating means maintains said equipment in stabilized orientation with respect to the surface over which it is suspended, while stationary and during the movement of said equipment.

67. The suspension system of claim 1 wherein the means for operatively connecting said equipment with said equipment support member includes means for orienting said equipment with respect to said equipment support member.

* * * * *